United States Patent [19]

Levy et al.

[11] B 3,999,163
[45] Dec. 21, 1976

[54] SECONDARY STORAGE FACILITY FOR DATA PROCESSING SYSTEMS

[75] Inventors: John V. Levy, Maynard; Steven R. Jenkins, Medford; Victor Ku, Westboro; Peter McLean, Stow; Thomas N. Hastings, Arlington, all of Mass.

[73] Assignee: Digital Equipment Corporation, Maynard, Mass.

[22] Filed: Jan. 10, 1974

[21] Appl. No.: 432,140

[44] Published under the second Trial Voluntary Protest Program on March 23, 1976 as document No. B 432,140.

[52] U.S. Cl. .......................................... 340/172.5
[51] Int. Cl.² .......................................... G06F 3/00
[58] Field of Search .......................... 340/172.5

[56] References Cited

UNITED STATES PATENTS

| | | | |
|---|---|---|---|
| 3,618,041 | 11/1971 | Horikoshi | 340/172.5 |
| 3,623,022 | 11/1971 | Daye | 340/172.5 |
| 3,643,223 | 2/1972 | Ruth et al. | 340/172.5 |
| 3,699,532 | 10/1972 | Schaffer et al. | 340/172.5 |
| 3,742,457 | 6/1973 | Calle et al. | 340/172.5 |
| 3,760,364 | 9/1973 | Yamauchi et al. | 340/172.5 |
| 3,766,526 | 10/1973 | Buchanan | 340/172.5 |
| 3,810,105 | 5/1974 | England | 340/172.5 |
| 3,828,325 | 8/1974 | Stafford et al. | 340/172.5 |

*Primary Examiner*—Charles E. Atkinson
*Attorney, Agent, or Firm*—Cesari and McKenna

[57] ABSTRACT

A secondary storage facility including magnetic tape, disk or drum units or other sequential access storage units. Each storage unit or drive connects to a controller by means of a device bus with asynchronous and synchronous paths. Status and controller information is coupled between the controller and a selected drive unit asynchronously over the asynchronous bus. Actual data transfers occur between the controller and a drive over the synchronous bus and between other units in the system and the controller using direct memory access or equivalent data transfers.

32 Claims, 21 Drawing Figures

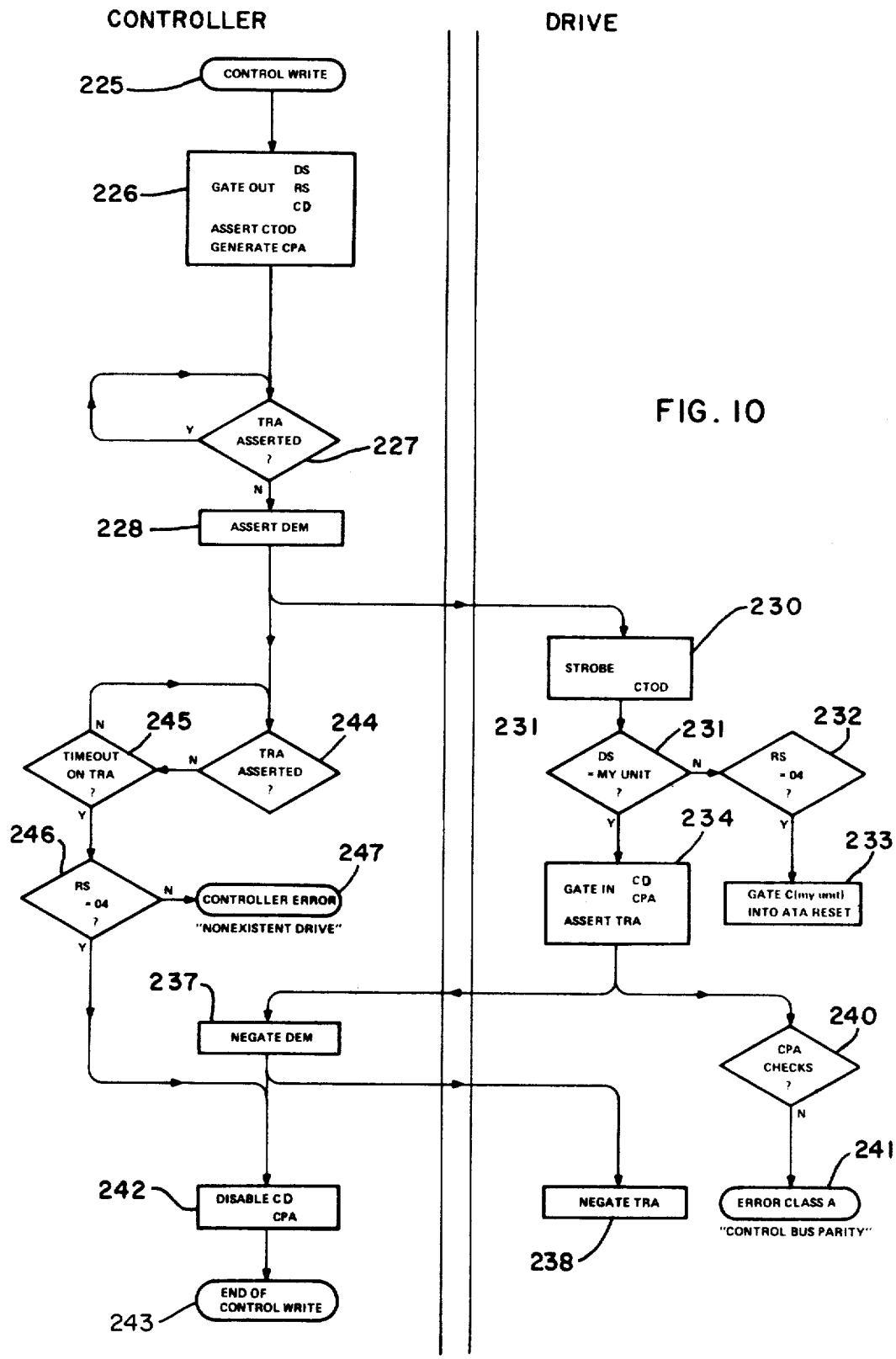

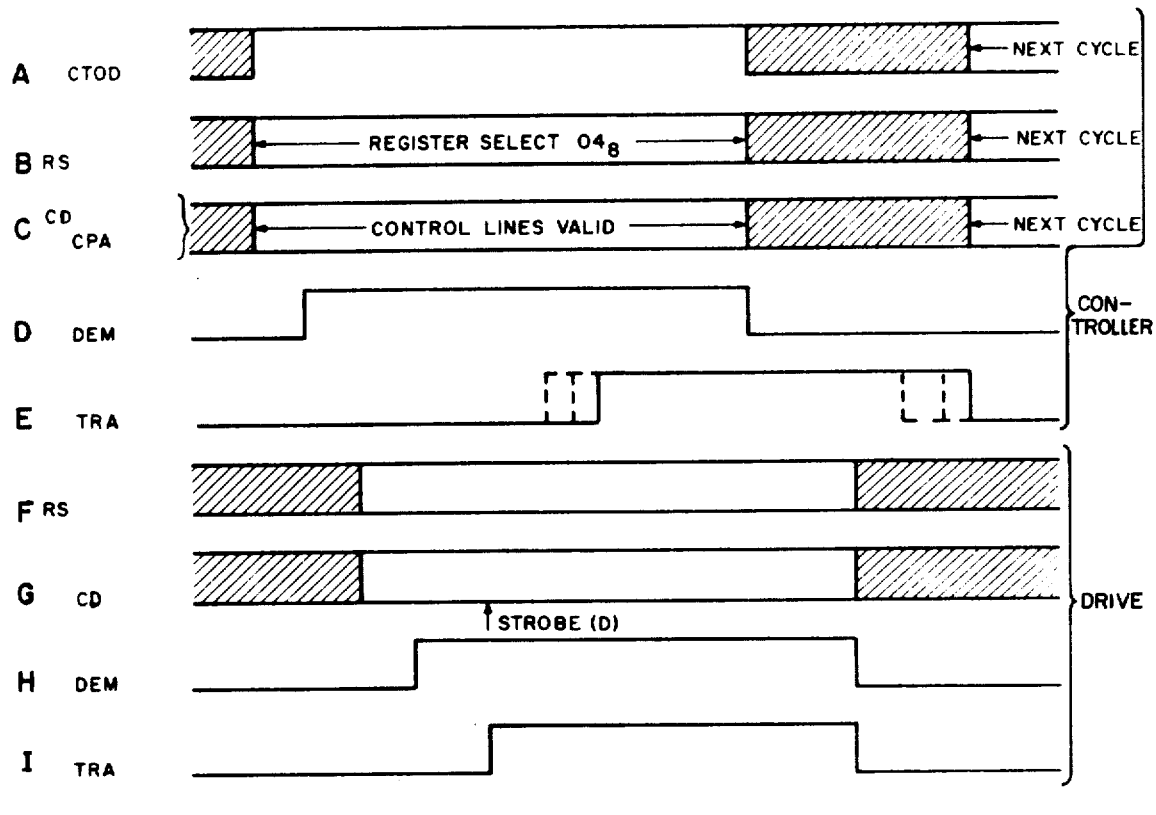
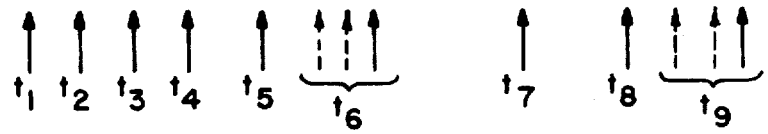
FIG. 15

SECONDARY STORAGE FACILITY FOR DATA PROCESSING SYSTEMS

BACKGROUND OF THE INVENTION

This invention generally relates to data processing systems and more specifically to secondary storage facilities connected in such systems.

Secondary storage facilities comprise elements which are not an integral part of a central processing unit and its random access memory element, but which are directly connected to and controlled by the central processing unit or other elements in the system. These facilities are also known as "mass storage" elements and include magnetic tape memory units, disk units and drum units.

These facilities are also termed "sequential access storage units" because the information stored in one of these units becomes available, or is stored, only in a "one-after-the-other" sequence, whether or not all the information or only some of it is desired. For example, it is usual practice to retrieve information from a disk unit on a "sector-by-sector" basis, even though only one of several information records in a sector is needed. Similarly, a physical record on a tape is analogous to a sector on a disk and a complete physical record may be retrieved even though it may contain more than one relevant information record.

These devices are also "serial storage devices". In a serial storage device time and sequential position are factors used to locate any given bit, character, word or groups of words appearing one after the other in time sequence. The individual bits appear or are read serially in time.

In modern data processing systems a secondary storage facility includes a controller and one or more drives connected thereto. The controller operates in response to signals from the data processing system, usually on an input/output bus which connects together other elements in the system including the central processing unit. A drive contains the recording medium (e.g., tape or a rotating disk), the mechanism for moving the medium, and electronic circuitry to read data from or store data on the medium and also to convert the data between serial and parallel formats.

The controller appears to the rest of the system as any other system element on the input/output bus. It receives commands over the bus which include command information about the operation to be performed, the drive to be used, the size of the transfer, the starting address on the drive for the transfer, and the starting address in some other system element, such as a random access memory unit. The controller converts all this command information into the necessary signals to effect the transfer between the appropriate drive and other system element. During the transfer itself, the controller routes the data to or from the appropriate drive and from or to the input/output bus or a memory bus.

In prior systems, each secondary storage facility was unique. That is, a controller was designed to link a specific drive to a specific data processing system and a drive was designed to be connected to a specific controller. If a new drive was developed, a new controller was also developed. This was especially true if the new drive was a different type of drive. For example, if a new magnetic tape drive was developed for a system, it was not possible to use an existing disk drive controller for that system in conjunction with the new tape drive. Rather, it was necessary to design a new magnetic tape drive controller.

This procedure, of course, led to duplications of engineering effort, even when the same manufacturer introduced new drives or data processing systems. Entirely new secondary storage facilities were usually developed. The uniqueness of each of the drives and controllers also led to user problems. If a user already had a system, he often had to replace both drives and controllers to obtain the benefits of a new drive. Furthermore, a controller was adapted to operate with one type of drive, so it was not possible to intermix the same types of drives (e.g., different disk drives) on one controller. This sometimes necessitated a different controller for each drive even though neither controller was used to capacity.

Therefore, it is an object of this invention to improve the operation of a secondary storage facility including a controller and a drive.

Another object of this invention is to provide such a facility in which the drive design is independent of a particular controller or data processing system.

Still another object of this invention is to provide such a facility in which the controller design and operation are independent of the controlled drive.

Yet another object of this invention is to provide such a facility in which a single controller can control different types of drives.

Still yet another object of this invention is to provide such a facility in which a single drive can be used with different kinds of data processing systems.

SUMMARY OF THE INVENTION

In accordance with this invention, two distinct paths interconnect a controller and drive. One is an asynchronous drive control path including data, address and control lines. The signals over this path perform control functions and include control signals for effecting information transfers to or from addressed storage locations in the drive. The starting address in the drive and the size of the transfer are typical items of information which are sent to the drive over this path.

The second path is a synchronous data path which transfers the data itself. It contains data and control lines. The control lines carry signals used for synchronizing the controller and drive, starting a data transfer and signalling any malfunctions which might occur during the transfer.

The signals on these two paths constitute a standard set of signals which can control disk drives, magnetic tape drives, magnetic drum drives and other sequential access or serial storage devices. If a system contains a controller constructed in accordance with this invention, then any drive which is constructed in accordance with this invention can be interchanged without altering the controller. Further, a set of these drives can be connected to another type of data processing system just by changing only a part of the controller. No changes are necessary to the drives. In fact, if the new data processing system already has a controller constructed in accordance with this invention, then drives from the former system can be connected without any further alterations. Thus, a controller is independent of the drive it controls and the drive is independent of the controller and system to which it connects.

This invention is pointed out with particularity in the appended claims. The above and further objects and advantages of this invention may be attained by referring to the following description taken in conjunction with the accompanying drawings.

BRIEF DESCRIPTION OF THE DRAWINGS

FIG. 10 is a flow chart of the operation for storing information in a register shown in FIG. 7;

FIG. 15 includes timing charts for storing information in a specific register;

DESCRIPTION OF ILLUSTRATIVE EMBODIMENTS

I. General Description

Figure 1:
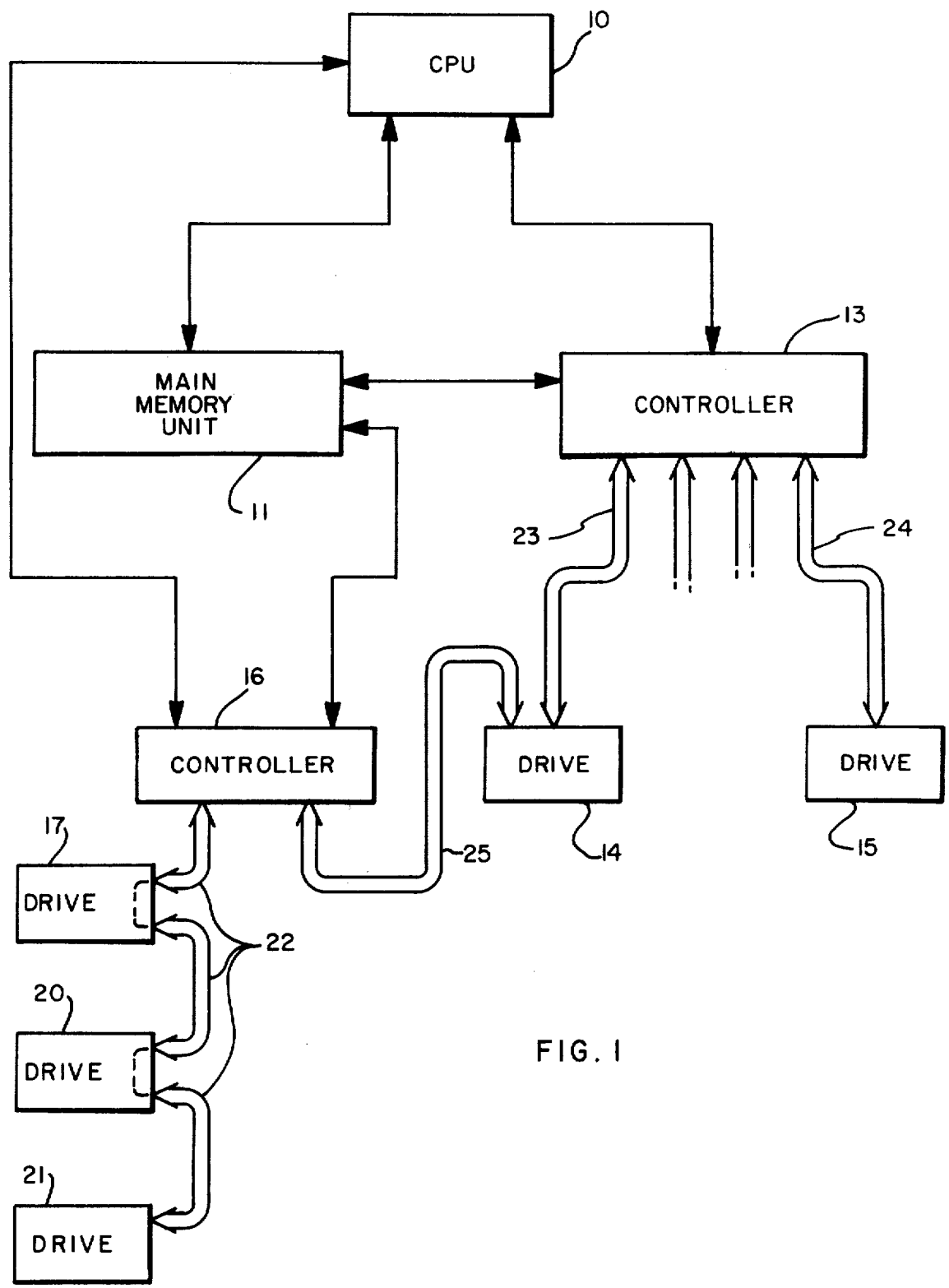
FIG. 1 is a generalized block diagram of a data processing system adapted to use this invention.

FIG. 1 depicts the general organization of a data processing system comprising a central processing unit (CPU) 10 and a main memory unit 11, normally a random access memory unit. Information also may be transferred to or from a secondary storage facility including a controller 13 and several drives, drives 14 and 15 being shown by way of example. Another such storage facility includes a controller 16 and drives 17, 20 and 21. This facility is also coupled to the central processing unit 10 and the main memory unit 11.

As previously indicated, a "drive" includes a recording medium and the mechanical and electrical components for recording data on or reading from the recording medium in the context of this invention. For example, it can comprise a fixed or movable head disk memory unit, a magnetic drum memory unit or a magnetic tape unit, as well as non-mechanically driven memory units. Timing signals derived from the medium normally synchronize data transfers with movement of the medium. A typical drive contains control, status, error and other registers for controlling and monitoring drive operations.

A controller 13 or 16 may be located physically separately from the central processing unit 10 as shown in FIG. 1 or may be an integral part of a central processing unit. Controllers serve as "interfaces" between the central processing unit and the drive. They contain the circuits for exchanging data with either the central processing unit 10 or the main memory unit 11. Buffer registers in the controller 13 or 16 compensate for the usually different transfer rates between the controller and main memory unit 11, on the one hand, and between the controller and drive, on the other hand.

Drives are connected to controllers by means of device buses in several different configurations. If, for example, the controller 16 were connected to drive 17 only, the arrangement would be termed a "single drive" configuration. Actually, as shown in FIG. 1, the drives 17, 20 and 21 are interconnected by a device bus 22 which is threaded from one drive to the next. This is an example of a "daisy-chain" configuration. Device buses 23 and 24 connect drives 14 and 15, respectively, in a "radial" configuration. Drive 14 is linked to the controller 16 by way of a device bus 25; the drive 14 is thus in a "dual controller-single drive" configuration.

It will become apparent from the following discussion that this invention is adapted for all these configurations. The user of a system will determine his own specific configuration. It also will become apparent that if drive 14 is one type of magnetic disk memory unit, drive 15 can be another unit of the same type, a magnetic disk memory unit of another type, or even a magnetic tape or magnetic drum unit or other type of sequential access memory. Moreover, drives 17, 20 and 21 could be directly connected to controller 13 without any modification to either the controller 13 or any of the drives.

This interchangeability and resultant flexibility result because each of the device buses 22, 23, 24 and 25 contains a standard set of corresponding conductors for transferring signals according to this invention, notwithstanding the drive connected to the device bus or the data processing system which is involved. As new drives are developed with improved storage media such as tapes and disks with higher recording density or even of new media, it will only be necessary to have the drive itself conform to the standard set of signals, no new controller development will be necessary.

Figure 2:
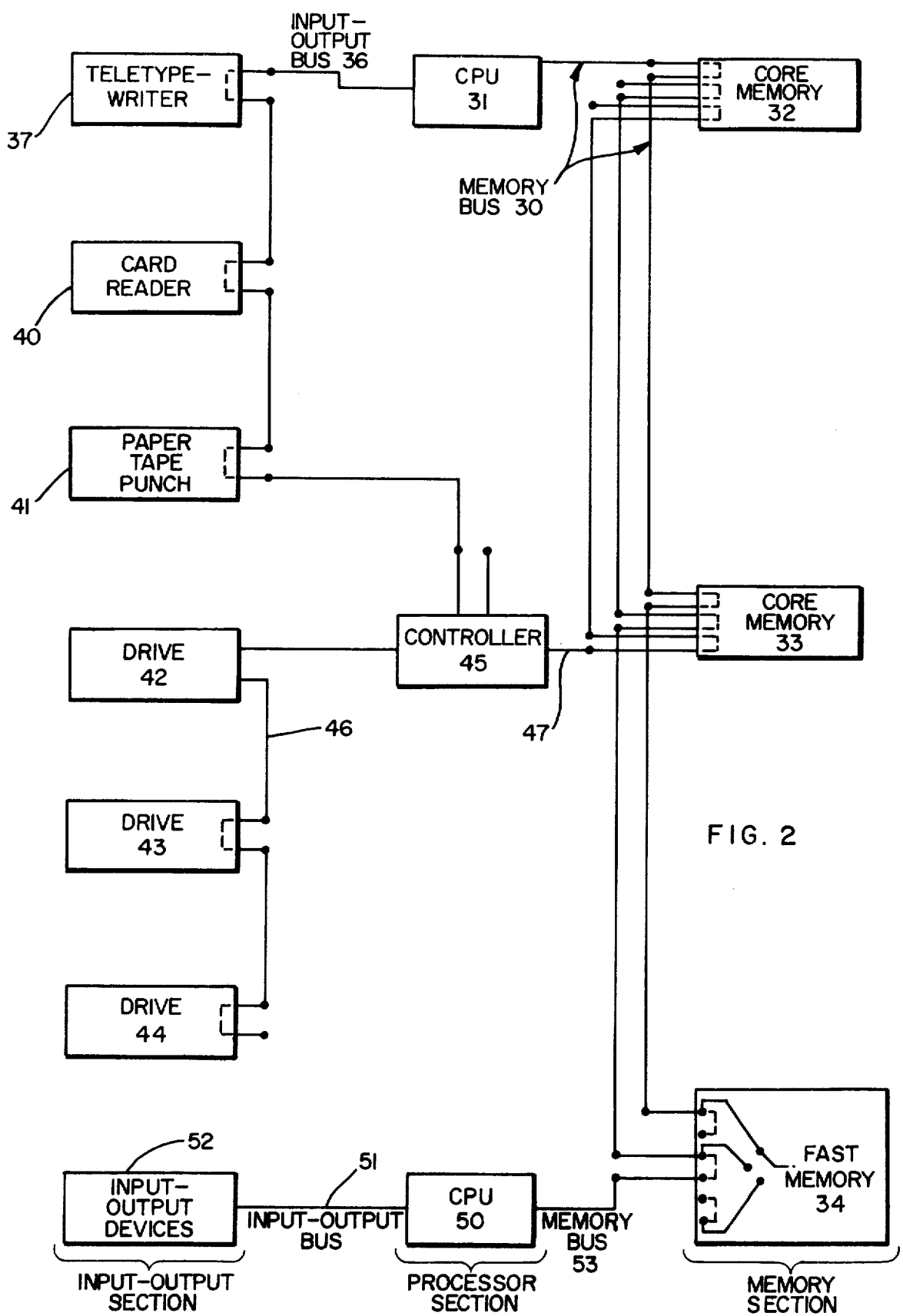
FIG. 2 is a block diagram of one type of data processing system shown in FIG. 1 in which separate memory and input/output buses link elements in the system.
Figure 3:
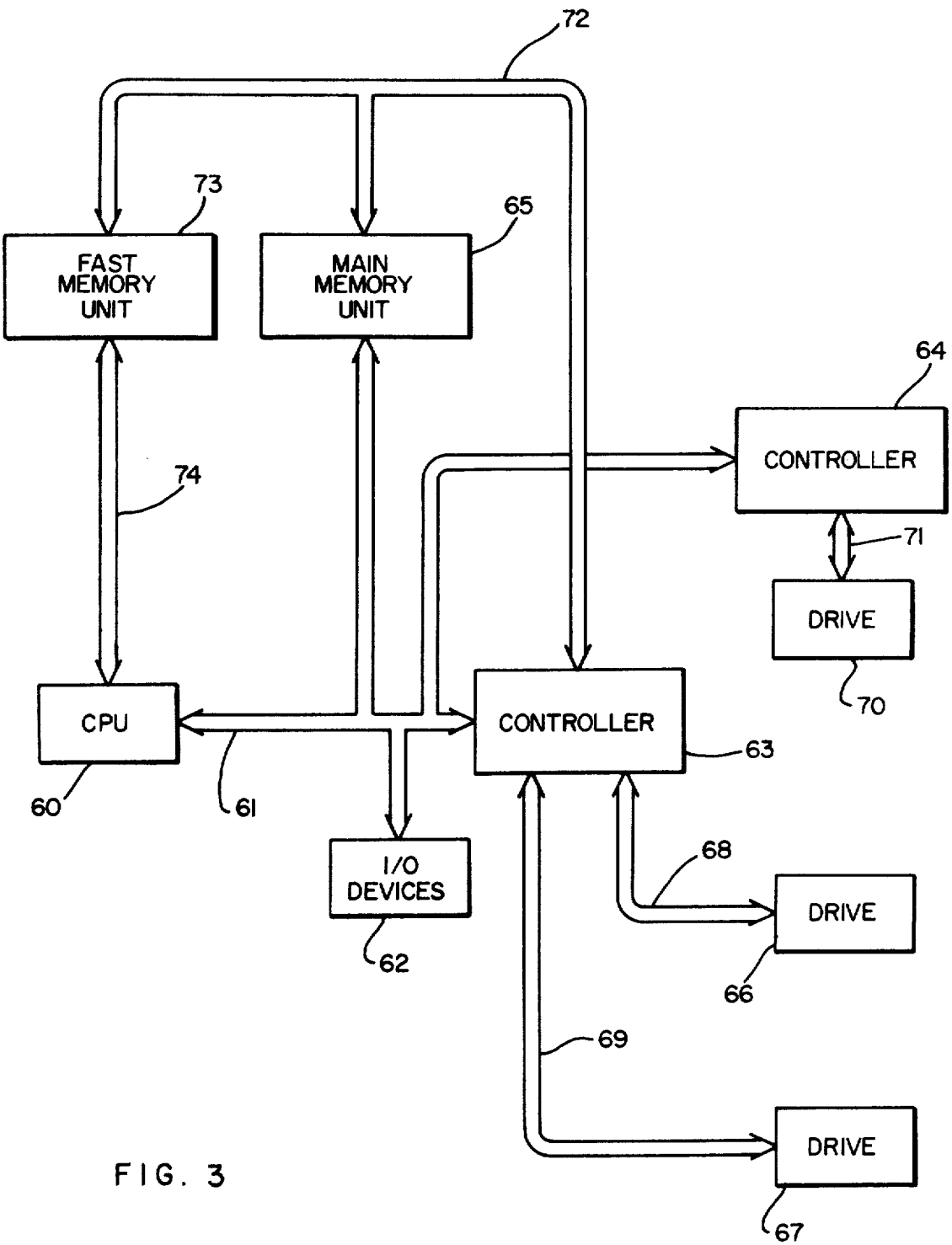
FIG. 3 is a block diagram of another type of data processing system shown in FIG. 1 in which a single bus is common to all elements in the system.

New drives will also be independent of the type of data processing systems to which they connect. FIGS. 2 and 3 depict diverse types of data processing systems. The nature of the data processing system has no effect on the drive itself. Although these two data processing systems form no part of the invention, the fact that they are diverse types of systems emphasizes the flexibility that this invention provides to secondary storage facilities. Also, specific examples of data processing systems will facilitate an understanding of the detailed discussion of this invention.

FIG. 2 illustrates a data processing system containing two separate data paths. The system is also segregated into input-output, processor and memory sections. A memory bus 30 connects a first central processing unit (CPU) 31 with a memory section including, for example, a core memory 32, a core memory 33 and a fast or volatile memory 34. An input-output bus 36 connects the central processing unit 31 with several input-output devices such as a teletypewriter 37, a card reader 40, and a paper tape punch 41. The memory bus 30 and the input-output bus 36 carry control, address and data signals in two directions. The signals on each bus are transferred in parallel, as distinguished from serial transmission.

The central processing unit 31 can also control the transfer of data between the memory section and a secondary storage facility. In FIG. 2 this storage facility comprises drives 42, 43 and 44 connected to a controller 45 by a device bus 46 in a daisy-chain configuration. In accordance with this invention, the controller 45 receives control information over the input-output bus 36 to be processed by an asynchronous drive control path within the controller 45. A synchronous data path in the controller may transfer data to the memory bus 30 or, as shown, to a second memory bus 47. Thus, transfers between the secondary storage facility and the memory section occur only with minimum use of the input-output bus 36 and the central processing unit 31 because data can be transferred directly through the controller 45 to the memory section. As also shown in FIG. 2 a second central processing unit 50 connects through an input-output bus 51 to other input-output devices 52. The central processing unit 50 also connects to the memory section through a bus 53, which enables the unit 50 to use the memory units 32, 33 and 34 in common with the processing unit 31 including data supplied to the memory section by the secondary storage facility.

As previously stated, this is an example of a data processing system which has separate input-output and memory buses. In operation, the central processing unit 31 might require some program stored in the drive 42. A second program already stored in the memory section would contain the necessary instructions to transfer a command to the controller 45 over the bus 36 to identify a particular drive, such as the drive 42, the starting location in the drive (e.g., the track and sector numbers in a disk memory unit) and other necessary information, as known in the art. Once the controller 45 receives that information, it retrieves data from the drive 42 and then transfers it to the memory bus 47 directly for storage and subsequent use by the central processing unit 31 or even the central processing unit 50.

Analagous transfers occur in a system using a common bus to interconnect the system elements. Such a system is shown in FIG. 3 and comprises a central processing unit (CPU) 60 and a first common bus 61. The bus 61 contains address, data and control conductors. It connects the central processing unit 60 in parallel with input-output devices 62 and controllers 63 and 64 associated with two secondary storage facilities.

The system in FIG. 3 includes a main memory unit 65 connected to the bus 61. Data transfers can occur over the bus 61 between the main memory unit 65 and any of the drives 66 and 67 connected to the controller 63 in a radial configuration by device buses 68 and 69, respectively, or a drive 70 connected in a single drive configuration to controller 64 by a device bus 71. These transfers occur over the bus 61 without requiring the CPU 60 to perform an interruption routine.

The controller 63 has an additional connection for another bus 72 which is identical to the bus 61. The bus 72 is coupled to a second part of the main memory 65, which is a "dualport" memory. This bus 72 also connects to a fast memory 73, which is coupled to the central processing unit 60 through dedicated bus 74.

With this data processing system, the central processing unit 60 can transfer a command to the controller 63 over the bus 61. The controller 63 then can prepare a drive, such as the drive 66 for an operation by transferring control information over the drive control path in the device bus 68. Data can then pass over the synchronous data path in the device bus 68 through the controller 63 and then either onto the bus 61 or, for more efficient operation, over the bus 72 directly into the memory 65 or 73. If the transfer is being made to another one of the input-output devices 62, the data may pass over the bus 61.

The signals over each of the device buses 46 in FIG. 2 and 68, 69 and 71 in FIG. 3 are the same. This means that the controllers 45, 63 and 64 have the same circuitry at their respective device bus connections. The only required differences between the controllers are those necessary for connection to the data processing system buses.

As the drives are connected only to device buses and all device buses are the same, the drive circuits are independent of any particular system. Of course, different data processing systems have different word sizes which can range from 8 bits to 36 bits or more. Circuit modifications in the controllers or the drives can be made to accomodate these different word sizes. At this point it is sufficient to consider the use of a basic 18-bit word. No modification is necessary for a central processing unit using 18-bit words. To provide a 36 bit word for other data processing systems the controller merely needs to concatenate pairs of 18-bit words. Other arrangements can be used when the data processing system word length is not an exact multiple of a drive word length.

II. The Device Bus

Figure 4:
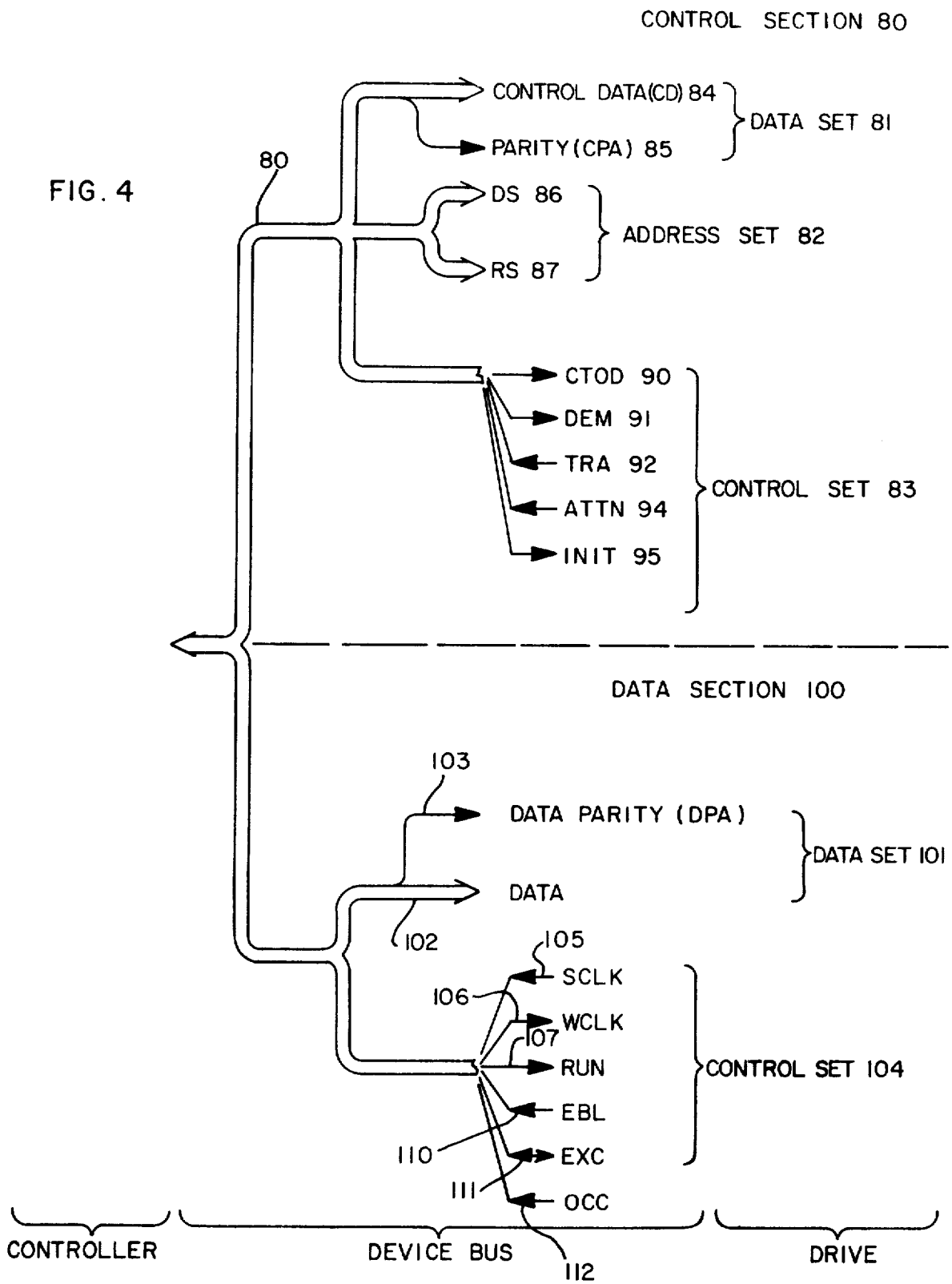
FIG. 4 depicts an interconnecting bus between a drive and controller in accordance with this invention.

To understand the interaction between a controller and device it is helpful to discuss first the specific signals which appear on the device bus and the functions each performs. A device bus, with its signal designations, is shown in FIG. 4; and the same mnemonic identifies a wire or group of wires and the signals they carry. Every device bus has the same construction. A drive control section 80 contains conductors segregated into a data set 81, an address set 82 and a control set 83. Within the data set 81 there are bidirectional control data (CD) wires 84 for carrying control and status information between a controller and any of its respective drives. A bidirectional CPA wire 85 carries a parity bit. The control information includes commands which control the operation of the drive. Some of the commands initiate data transfer and include READ, WRITE and WRITE CHECK commands. Other commands initiate control operations such as positioning heads in a movable head disk drive, winding a tape in a magnetic tape drive or clearing registers in a drive.

Within the address set 82, there are drive selection (DS) wires 86 and register selection (RS) wires 87. The DS wires 86 carry DS signals from a controller to provide information for selecting a drive for an ensuing transfer of control or status information. A controller also transmits the RS signals. Within the drive identified by the DS signals the RS signals define a specific register which is to be involved in a transfer.

The control set 83 includes a controller-to-drive transfer (CTOD) wire 90. When a controller asserts a CTOD signal (i.e., a logic ONE signal level), the following transfer over the data set 81 is from the controller to the selected register in the selected drive. When the CTOD signal is not asserted, (i.e., is at a logic ZERO signal level), the transfer is from the selected drive register to the controller.

A demand (DEM) wire 91 and a transfer (TRA) wire 92 carry asynchronous timing signals. Specifically, the controller puts a DEM signal onto the wire 91 to initiate a transfer of control information. The selected drive transmits the TRA signal to indicate the receipt of control information or the availability of status information.

Whenever any drive requires some interaction with the controller and data processing system, it transmits an ATTN signal onto a single ATTN wire 94 which is common to all drives. Usually the controller responds by interrupting the data processing system.

AN INIT signal on a wire 95 serves as a facility resetting signal. Upon receipt of the INIT signal, a drive immediately terminates its operation, clears all error conditions and becomes available to the controller and system for further operations.

A synchronous data section 100 shown in FIG. 4 carries blocks of data at high transmission speeds between the controller and drives. These blocks of data are carried in response to READ, WRITE and WRITE-CHECK commands previously sent to a controller and its respective drive with related transfers occuring over the control section 80. The data section 100 also serves as a link for control signals which initiate and terminate the block transmissions. Bidirectionally conducting wires in a data set 101 comprise data wires 102 for carrying the data itself and a data parity (DPA) wire 103. A control set 104 includes a SCLK wire 105 and a WCLK wire 106. The drive uses timing signals derived from the recording medium to produce SCLK signals on the SCLK wire 105 to synchronize the reading of data from the data wires 102 and DPA wire 103 when the data moves to the controller. When the data is to be stored in the drive, the controller receives SCLK signals and transmits WCLK signals back to the drive. The WCLK signals control the writing of data onto the recording medium in the device.

A RUN signal controls the initiation of a data transfer and the overall duration of the transfer; it appears on a RUN wire 107. The controller asserts the RUN signal to start a data transfer in accordance with a command which was previously transferred to the drive over the drive control section 80. Subsequently, circuits in the drive use the RUN signal to determine the time for terminating the transfer. An EBL signal transmitted by the drive on a wire 110 signals the end of a "block". Any transfer terminates if, at the end of an EBL signal, the RUN signal is not asserted. Otherwise, the transfer operation continues through the next "block". In this connection the term "block" has a conventional meaning as applied to magnetic tape memory units and is equivalent to a "sector" as that term is conventionally applied to magnetic disk memory units. Thus, in this description, "block" is used in a generic sense to indicate a conveniently sized group of data bits to be sent as a unit.

An EXC wire 111 in the synchronous data section 100 is a bidirectional wire for carrying exception (EXC) signals. When the drive transmits the EXC signal, some error has occurred during the transmission. This signal remains asserted until the last EBL signal during the transfer terminates. An EXC signal from a controller, on the other hand, causes the drive to terminate any action it was performing in response to a command.

There is also an occupied (OCC) wire 112. Whenever a drive begins to perform a data transfer over the synchronous section 100, the drive transmits an OCC signal to a controller. This positively indicates that a drive connected to that controller is busy with a data transfer.

With this understanding of the signals which appear on a device bus, it is possible to discuss generally the circuits in a controller. Looking first at the synchronous data path in FIG. 5, it will be apparent that only one drive connected to a controller may respond to a READ, WRITE or WRITE-CHECK command at any given time because the data section 100 (FIG. 4) is connected to all the drives a controller supervises. Data transfers pass between a system bus 120 and a device bus 121. The system bus might be the memory bus 30 in FIG. 2 or either of the buses 61 or 72 in FIG. 3. Reference numerals used to designate wires in FIG. 4 are applied to corresponding wires in FIGS. 5 through 7 as all device buses are the same.

Incoming data from either a system bus 120 in response to a WRITE command or the data section 101 of a device bus 121 in response to a READ or WRITE-CHECK command is loaded into an input buffer 122 for transfer into a storage facility 123. When the facility 123 is filled, the first word in is loaded into an output buffer 124. A data path control circuit, generally 126, then either effects a transfer onto the device bus 121 for transfer to the device or a transfer onto the system bus 120 for transfer to a designated location in the data processing system. The controller also contains the necessary circuits for generating the appropriate address signals to identify a memory location which either stores the data to be transferred to the controller or which is to receive the data from the drive.

III. Drive Control Path

Figure 6:
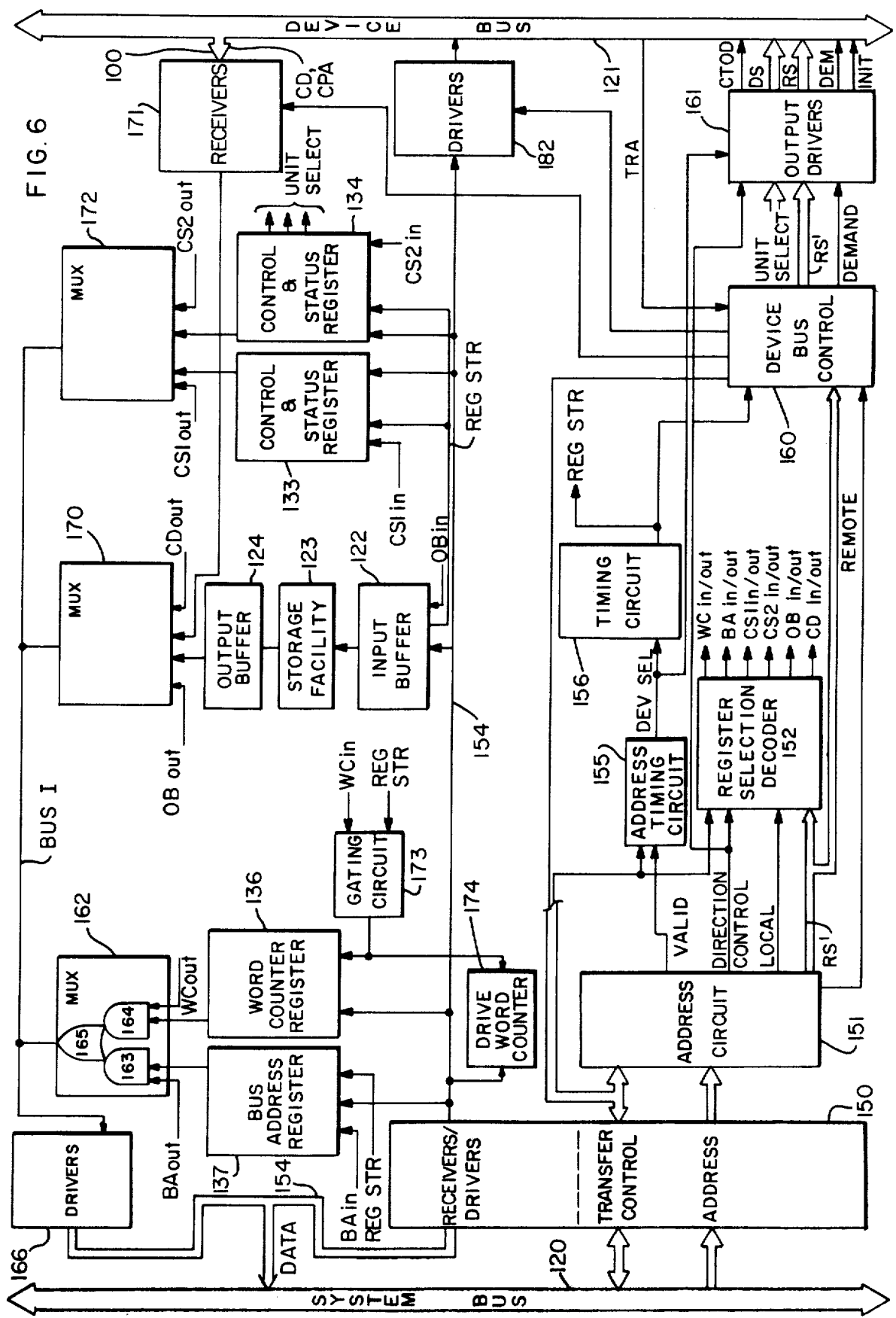
FIG. 6 is a block diagram of an asynchronous drive control path in a controller as adapted for connection to a system as shown in FIGS. 2 or 3.
Figure 7:
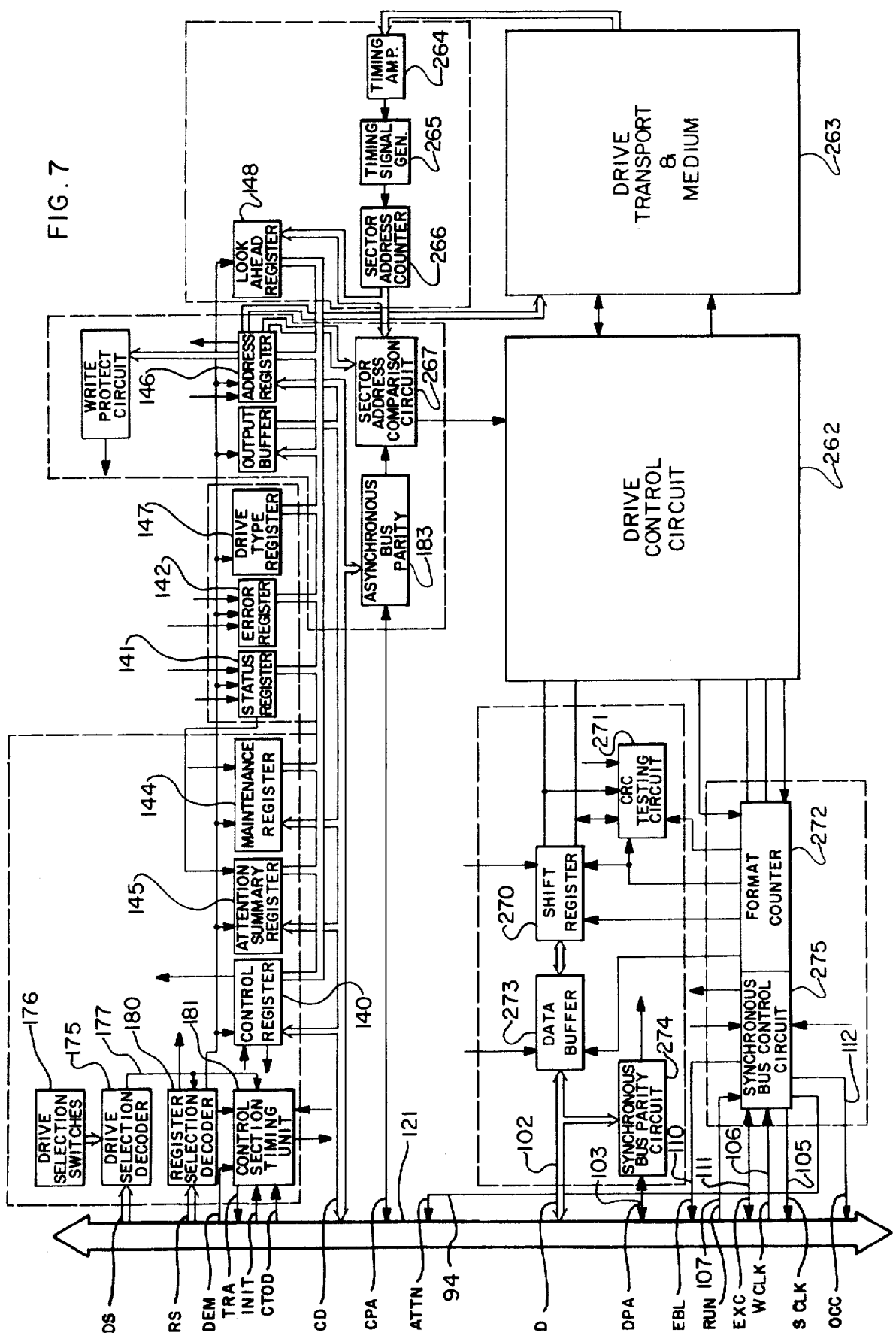
FIG. 7 is a block diagram of a drive constructed in accordance with this invention.

A typical drive control path is shown in FIGS. 6 and 7. The controller shown in FIG. 6 contains several registers, which are called "local" registers. They include:

1. Control and status registers 133 and 134 for receiving commands and for receiving and storing operational status information for the controller;

2. The output buffer 124; this register has a connection 124 (FIG. 5) to the drive control path and its contents may be retrieved under system control for diagnostic and other purposes;

3. A word counter register 136 for storing the number of words to be transferred; it counts each data word as it is transferred and disables the drive upon the completion of the transfer;

4. A bus address register 137 for storing the address of a location connected to the system bus 120, which is either sending or receiving the data.

FIG. 7 depicts a fixed-head disk memory unit as a typical drive for purposes of explanation. Such a drive contains the following registers, which are called "remote" registers:

1. A control register 140 analagous to the control and status register 133 (FIG. 6); it stores commands and other control information; the control register 140 and the control and status register 133 can be considered as a single register in which stages are distributed among the controller and each drive connected to the controller;

2. A status register 141 for storing non-error status bits and a summary error bit; one bit position, for example, indicates whether the drive is in a ready state;

3. An error register 142 for storing error information; other drives may contain more than one such register;

4. A maintenance register 144 for storing information useful in diagnostic and maintenance operations;

5. A stage in attention summary register 145; each drive has one stage for indicating whether it has generated an ATTN signal; this register can be considered as having individual stages distributed among each of the drives.

6. A desired track and sector address register 146 for storing the number of the drive track and sector at which a transfer is to start;

7. A drive type register 147 for storing information concerning the nature of the drive; and 8. A look-ahead register 148 for storing information concerning the actual rotational position of the disk.

Other registers which might be included in a fixed-head or other type of drive include:

1. A serial number register for displaying part or all of the device serial number; and 2. ECC position and pattern registers in drives having error-correcting codes for storing the position of an ECC pattern burst and the pattern itself.

Moving-head magnetic disk memory units normally will include:

1. An offset register for storing the amount of head offset in a moving head disk memory unit; such a register might also store information for controlling the enabling of header information or error correction circuits.

2. A desired cylinder address register for storing the cylinder address which is to be reached; and 3. A current cylinder address register for storing the actual head position over the disk in terms of a disk cylinder.

These registers are discussed more fully in connection with the operation of the drive control path.

All operations of controller and drives in a secondary storage facility constructed in accordance with this invention are under the control of information stored in these registers in the controller (FIG. 6) and the drive (FIG. 7). For example, a transfer of data between the recording medium and a memory unit requires the central processing unit to transfer several items of information into the local and remote registers. The identification of the drive to be involved in the transfer is loaded into the control and status register 134 (FIG. 6). The register 134, in turn, produces corresponding unit select signals. The bus address register 137 receives the initial memory address while the word counter register 136 receives a number (usually in two's complement) defining the number of data words in the block to be transferred.

Once the control and status register 134 contains the drive information, additional transfers are made to specific remote registers in that drive (FIG. 7). The track and sector address is loaded into the track and sector address register 146. If the disk were a moving-head disk, then other information might be loaded into offset and desired cylinder address registers. Still other information concerning the function to be performed would be loaded into the control register 140. As apparent, each of these transfers involves operations for loading information into drive registers from the control section 80 in the device bus 121. Thus, they can be designated "writing" operations.

It is also necessary, from time to time, to retrieve the contents of certain registers to learn the status of the drive and controller (i.e., perform a "reading" operation). For example, the status register 141 contains a DRY bit position which indicates whether the drive is busy. The look-ahead register 148 may be read to determine the actual position of the disk.

Any time there is to be a transfer into or out of a local or remote register, address signals and transfer control signals appear on the system bus 120 shown in FIG. 6 including one set of direction control signals which indicate whether the transfer involves a reading or writing operation. For example, the transfer control signals discussed in U.S. Pat. No. 3,710,324 include C0 and C1 direction control signals. CONI and CONO signals discussed in U.S. Pat. No. 3,376,554 perform the same function. When the information is to move into a register, the information may appear on the system bus data lines simultaneously with or slightly after address and transfer control signals appear on the address and transfer control lines, depending upon the characteristics of the particular system.

A receivers/drivers circuit 150 in a controller (FIG. 6) comprises buffer circuits and pass the address signals and direction control signals to an address circuit 151. Each register has a unique address which the address signals designate and the address circuit 151 uses the address signals to indicate whether the address is for a register in the controller or in an associated drive. Thus, these signals implicitly indicate whether the designated register is a local or remote register and the address circuit 151 produces a corresponding LOCAL or REMOTE signal. Register selection signals (RS') from the circuit 151 pass to a register selection decoder 152 and to a device bus control circuit 160.

A. Local Transfers

When the address signals indicate that a register in the controller is to be selected (i.e., the address circuit 151 generates a LOCAL signal), the decoder 152 subsequently produces a signal which selects both the local register and the direction of the transfer. Each "conductor" from the decoder 152 is really two wires; one wire corresponds to a writing operation; the other, a reading operation. Thus, the decoder produces a "WCin" selection signal when a word count is to be stored in the word counter register 136. To read the contents of the word counter register 136, the decoder would produce a "WCout" selection signal.

Other transfer control signals from the bus 120, usually delayed for some period following the appearance of the address signals, enable the decoder 152 to produce an appropriate selection signal and enable an address timing circuit 155. These transfer signals may be either DATI, DATO, CONI or CONO signals in the system of FIG. 2 or MSYN and SSYN signals in the system of FIG. 3. The address timing circuit 155 produces a delayed DEV SEL signal in response to a first synchronizing signal if the address circuit has validated the incoming address and produced a VALID signal. The DEV SEL signal energizes a timing circuit 156. The timing circuit 156 transmits a REG STR pulse after the appearance of a signal from the decoder 152 and, in a writing operation, loads information on control data wires 154 into the selected local register. The timing circuit 156 may also couple the DEV SEL signal to the device bus control circuit 160 to produce another transfer control signal on the system bus 120 to indicate that the transfer is complete (when such a signal is necessary for a system operation).

To read the contents of the word counter register 136, for example, the address and transfer control signals cause the decoder 152 to transmit the WCout selection. This signal is one input to a multiplexer 162 which selectively couples the output of either the word counter register 136 or the bus address register 137 onto an intermediate bus designated BUSI. Specifically, the multiplexer 162 includes an AND gate 163 which receives the output from the bus address register 137 and an BAout signal from the decoder 152; and an AND gate 164 which receives the output of the word counter register 136 and the WCout signal from the decoder 152. An OR gate 165 couples the selected one of the AND gates 163 and 164 onto the BUSI bus and then, through drivers 166, onto the system bus 120.

The multiplexer 162 is shown diagramatically only. In an actual circuit there would be an AND gate associated with each bit position in each of the registers 137 and 136. The BAout and WCout signals would then enable all the AND gates associated with the respective registers.

The drive control path shown in FIG. 6 also contains multiplexers 170 and 172. Multiplexer 170 selectively couples signals onto the BUSI bus either from the output buffer 124 or from the drive coupled to the OBout device bus through receivers 171 in response to OBout or CDout signals from the decoder 152. CS1out and CS2out signals from the decoder 152 control the multiplexer 172 so it selects and couples the output of either the register 133 or the register 134 onto the BUSI bus.

While reading control information from a local register, the device bus control circuit 160 may, if the system requires it, issue another synchronizing control signal which indicates the transfer is complete. Once the REG STR signal terminates and the optional synchronizing control signal appears, the controller and system have completed the transfer (i.e., the selected local register has been read).

The steps for loading information into a local register are similar. The direction control signals from the address circuit 151 indicate a writing operation. Thus, an input conductor for a selected register, rather than a multiplexer, is energized by the decoder 152. When new information is to be stored in the word counter register 136, the decoder 152 produces the WCin signal. The information to be stored appears on the bus 154 which is equivalent to the control data wires 84 in FIG. 4. The coincidence of the REG STR and WCin signals loads the word counter register 136.

Normally the selection signal from the decoder 152 and the REG STR signal from the timing circuit 156 are applied directly to input gating circuits in their respective registers. FIG. 6, however, shows a gating circuit 173 whose output is applied to both the register 136 and a drive word counter register 174. The register 174 stores the number of words transferred between the controller and drive. As shown in FIG. 6, this register is not connected to the BUSI bus, so its contents cannot be read.

Thus, transfers of control information to or from local registers use the same sequence as the transfer of similar information to or from analogous registers in other units connected to an input-output bus or a common bus in the two disclosed systems. When the transfer involves a remote register, the controller must route the control information to involve the appropriate remote register. The control information still passes through the controller, but the controller must additionally control each transfer with the designated register.

B. Remote Transfers

When an address on the system bus 120 designates a register in a drive, the address circuit 151 produces a REMOTE signal which is applied to the device bus control 160. In response to this signal the device bus control 160 is enabled to pass the RS' signals from the address circuit 151 to the output drivers 161. The UNIT SELECT signals from the control and status register 134 and the direction control signals are also inputs to the drivers 161.

The appearance of a valid address, with its concomitant VALID signal, and the transfer synchronizing signal from the system bus 120 produce the DEV SEL and the REG STR signals as previously discussed. The DEV SEL enables the output to the device bus drivers 161 to couple the RS', UNIT SELECT, and direction control signals onto wires in the control set 83 of the device bus 121 as RS, DS and CTOD signals respectively. In addition, the REG STR signal causes the control 160 to produce a DEMAND signal which passes through the enabled output drivers 161 as the DEM signal.

Now referring to FIG. 7, a drive selection decoder 175 in each drive compares the incoming DS signals with signals from drive selection switches 176 to determine whether the DS signals identify that particular drive. If they do, the decoder 175 produces an enabling signal on a conductor 177 to activate a register selection decoder 180 and a control section timing unit 181. The register selection decoder 180 receives the RS signals and in response produces signals which are coupled to the selected register in the drive, e.g., registers 140, 141, 142, 144, 145, 146, 147 or 148. These selection signals enable subsequent timing signals from the timing unit 181 to effect a transfer. The timing unit 181 also receives the DEM and CTOD signals from the bus 121 and transfers a TRA signal onto the bus indicating that the drive has moved control information onto the data set 81 or that the data on the data set 81 has been stored.

Referring again to FIG. 6, the device bus control 160 receives the TRA signal and then either enables data to pass through the receivers 171 in response to the CDout signal from the register selection decoder 152, or enables the drivers 182 if the decoder has produced the CDin signal. In addition, the control 160 can produce the previously discussed optional synchronizing signal for controlling the transfer between the system and the controller. Thus, the decoder 152 produces a CDin or CDout signal during each remote register transfer.

A more thorough understanding of these remote register transfers will be obtained from a discussion of reading and writing operations in some detail in terms of the signal transfers between the controller in FIG. 6 and the registers in FIG. 7.

1 Reading Operation

Figure 8:
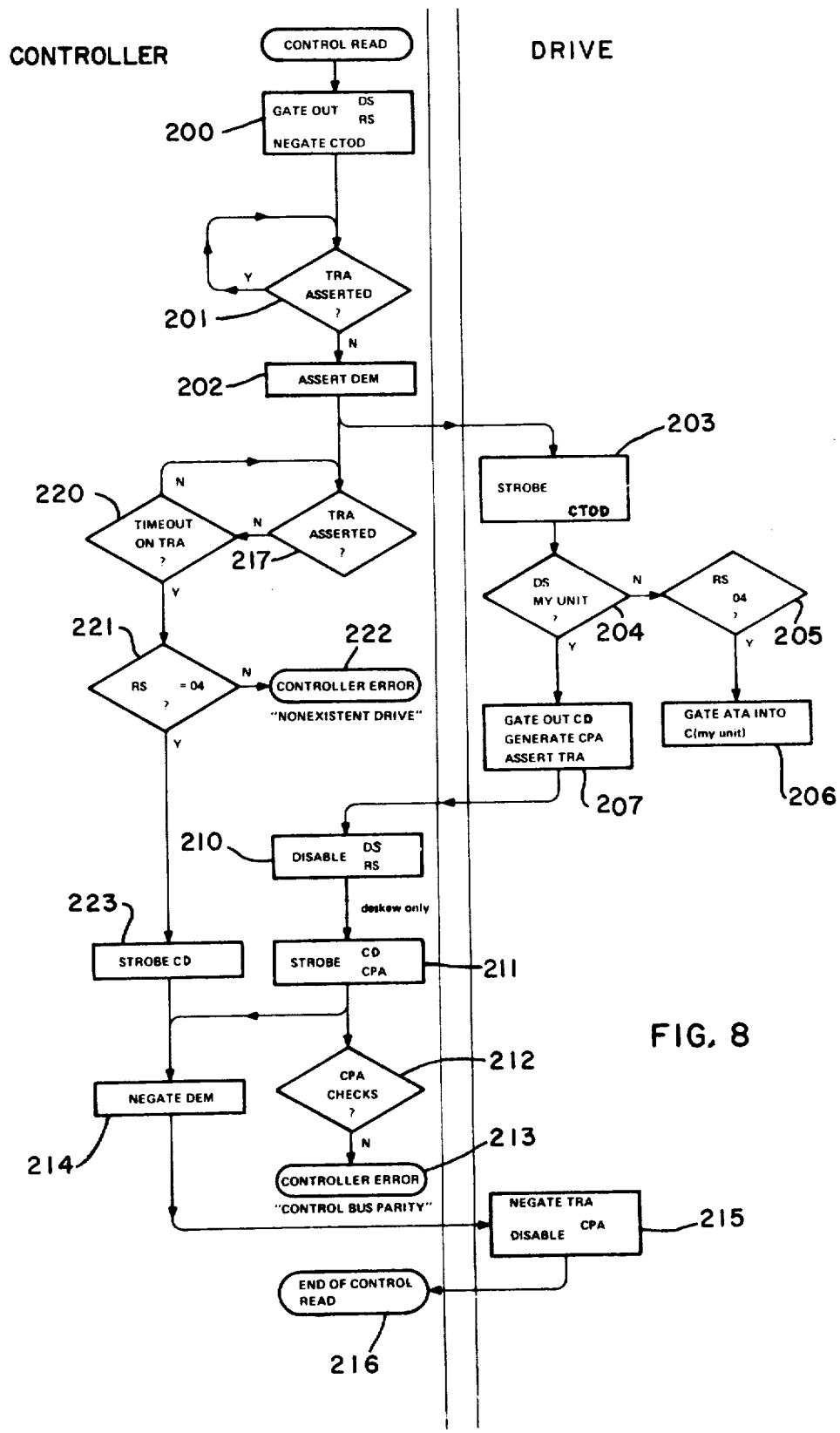
FIG. 8 is a flow chart of the operation for retrieving information in a register shown in FIG. 7.
Figure 9:
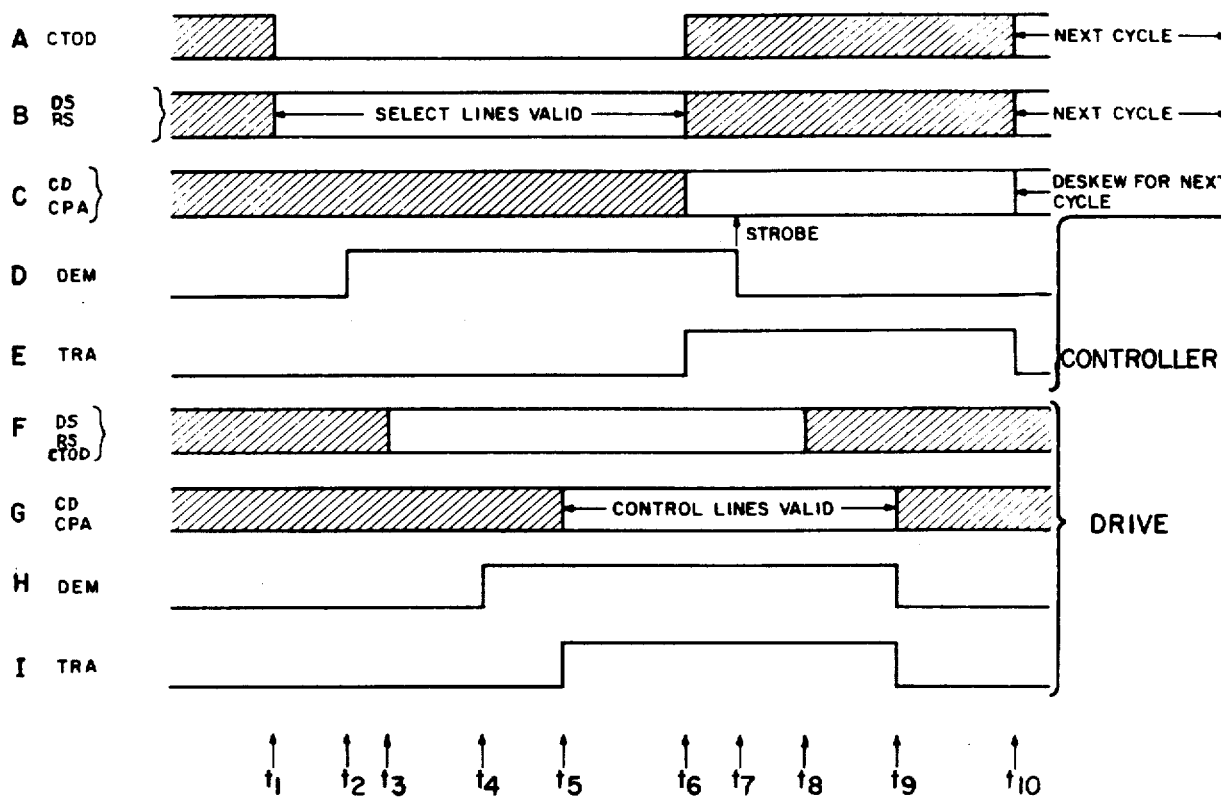
FIG. 9 includes timing charts corresponding to FIG. 8.

FIG. 8 is a flow chart of the steps necessary to read control information in a remote register while FIG. 9 illustrates the timing of such signals. Step 200 and Charts 9A and 9B represent the process of placing the appropriate values of the DS, RS and CTOD signals onto the device bus 121 from the output drivers 161 shown in FIG. 6 at time t1. If a TRA signal from a previous transfer with any drive connected to the controller is asserted, the controller waits for it to terminate as represented by step 201. At the completion of this interval, step 202 and Chart 9D indicate that the device bus control 160 and the output drivers 161 couple the DEM signal onto the device bus at time t2.

Now referring to FIGS. 6, 7, 8 and 9, the signals on DS, RS and CTOD wires from the controller arrive at the drive at time t3 (Chart 9F), the interval from t1 to t3 representing a bus signal propagation delay. After a similar delay from time t2, the DEM signal is received at the drive at time t4 (Chart 9H), causing the control section timing unit 181 to load (or strobe) the CTOD signal as represented by step 203. The drive selection decoder 175 will have already determined whether the drive is the selected drive. If the DS signals do not designate the drive (step 204), the drive in step 205 determines whether the RS bits designate the attention summary register. If a register other than the attention summary system is designated, but the DS bits do not select a drive, no further steps occur in that drive. If the attention summary register is addressed, then the ATA signal is sent (step 206) as described later.

Assuming that the DS signals identify the drive in FIG. 7, the control section timing unit 181 at time t5 loads the information from the selected register onto the control data lines in the bus 121 as disclosed in step 207A and Chart 9G. At the same time a control bus parity circuit 183 generates a parity bit which is loaded onto the CPA wire 85 and the unit 181 transmits the TRA signal at time t5 as shown in Chart 9I.

When the controller receives the control information and the TRA signal as shown in Charts 9C and 9E at t6, the device bus control 160 may immediately disable the DS, RS and CTOD signals (Charts 9A and 9B and step 210). After a short delay, the device bus control 160 opens the receivers 171 at time t7 to load the control information and parity signal from the device bus 121 through the multiplexer 170 and drivers 166 onto the system bus 120 (step 211). When the system receives the control information, the control 160 terminates the DEM signal (Chart 9D and step 214) so that the drive senses the transition of the DEM signal (Chart 9H) and terminates the TRA signal (Chart 9I and step 215) and the control data and parity signal. Once the controller senses the termination of the TRA signal at time t10 (Chart 9E), the transfer is complete (step 216).

As apparent, the control information at the receivers 171 in FIG. 6 is valid from time t6 to time t10 (Chart 9C). The TRA signal can therefore be used to synchronize operations on the system bus 120 and the device bus 121.

Referring to FIG. 8, once the controller transmits the DEM signal in step 202, it begins timing a response interval. This is represented by steps 217 and 220. If the drive transmits the TRA signal before the predetermined time interval expires, the interval timing operation terminates in step 217. If not, the controller, at the end of this interval, determines whether the attention summary register 145 is being read (step 221). If it is not, then no device has responded and a non-existent drive has been designated. Thus, step 221 branches to step 222, and the controller sets an NED bit position described later in the control and status register 134 (FIG. 6). If the attention summary register 145 has been addressed, step 221 branches to step 223, and all the information on the data set 81 is sensed before terminating the DEM signal at step 214.

If a parity error is discovered in step 212 during a transfer of information from a drive (step 211), step 213 causes an MCPE bit position in the status and control register 133 to be set.

2 Writing Operation

Figure 11:
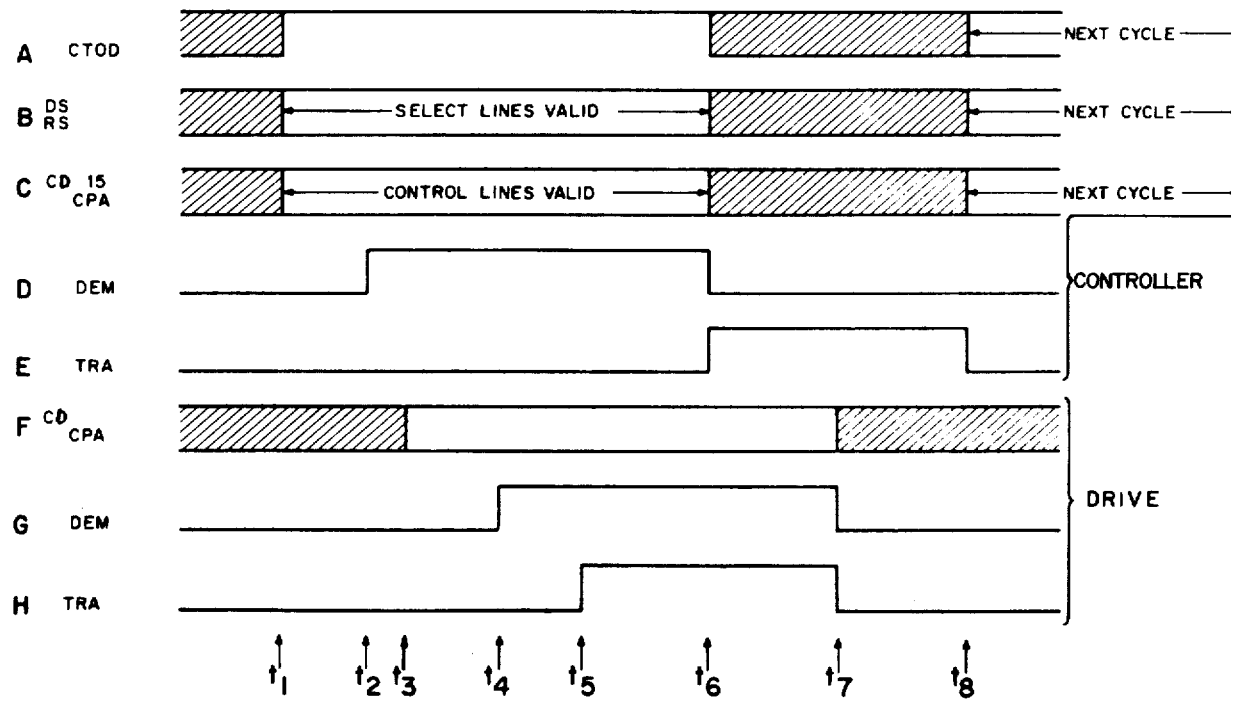
FIG. 11 includes timing charts corresponding to FIG. 10.

FIG. 10 is a flow chart for writing control information into a remote register while FIG. 11 is a corresponding timing diagram. When the controller receives a command to write control information (step 225) it transfers DS, RS and CTOD signals onto the control information lines and a parity signal onto appropriate wires in the control section 80. This occurs at step 226, which corresponds to time t1 as shown in Charts 11A, B and C. The control information passes through the drivers 182, shown in FIG. 6, under the control of a gating signal from the device bus control 160, which responds to the DEV SEL signal as previously discussed. The control signals pass through the output drivers 161.

If a TRA signal from a previous transfer with any drive connected to the controller is still asserted, the controller waits for it to terminate as shown in step 227 and discussed with respect to the reading operation. Then at time t2 the controller, in step 228, transmits the DEM signal onto the device bus 121 as shown in Chart 11D. Steps 230, 231, 232 and 233 are analogous to steps 203, 204, 205 and 206 in FIG. 8. The control information on the data set 81 arrives at the drive at time t3 (Chart 11F) and the DEM signal arrives at time t4 (Chart 11G). In response to these signals, the control section timing unit 181 in the drive (FIG. 7), in step 234 and at t5 in Chart 11H, loads the control information into the designated register and the CPA signal into the parity circuit 183. In steps 240 and 241, the circuit 183 provides a parity error signal if an error exists to set a PAR bit position in the error register 142.

At t5 the drive also transmits the TRA signal (Chart 11H), which arrives back at the controller at t6 (Chart 11E). In response, the device bus control 160 turns off the drivers 182 and the output drivers 161 thereby effectively disconnecting the controller and drive by terminating all signals from the controller on the device bus at t6 as shown in Charts 11A, B and C and including the DEM signal (Chart 11D). At t7, Chart 11F shows that the control information and parity signal from the controller on the data set 81 terminate at the drive as does the DEM signal. Thus, at t7 the drive terminates the TRA signal (Chart 11H) and the controller senses this termination at t8 (Chart 11E). This completes the writing operation and permits initiation of another cycle.

Now referring to FIG. 10, after the controller asserts the DEM signal in step 228, it starts timing a response interval like that in a reading operation. Steps 244, 245, 246 and 247 are analogous to steps 217, 220, 221 and 222 in FIG. 8. If the attention summary register 145 is being loaded, then the information remains on the control data wires until the end of the time-out period as described later. The controller then completes the writing operation by removing the control information in step 242 to complete the operation with step 243.

C. Local and Remote Registers

Local registers in the controller and remote registers in the drives store control and status information. Some registers, such as the word counter register 136, contain one item of information, such as the word count, so all bit positions or stages are interrelated. Other registers store diverse information in one or more groups of registers. For example, the control and status register 133 has a stage for indicating special conditions and another stage for indicating that a transfer related error has occurred. Registers in which all stages are interrelated may be arranged so either data can only be retrieved from them by the system (i.e., read-only register) or data can be retrieved or altered in them by the system (i.e., read/write register). Registers in the former category are denoted by a cross to the right of the designation in FIGS. 12 and 13. In registers which contain independent stages, each stage may be arranged so its data either may only be retrieved (i.e., a read only stage) or may be retrieved or altered (i.e., a read/write stage). A cross above a stage indicates that it is a read-only stage.

The particular assignment of bit positions or stages made in the following discussion of local and remote registers is for purposes of explanation only. Other assignments may be made. Further, certain of the defined stages and the information they represent may be omitted and other stages representing other information may be substituted or added.

1 Control and Status Register 133

Figure 12:
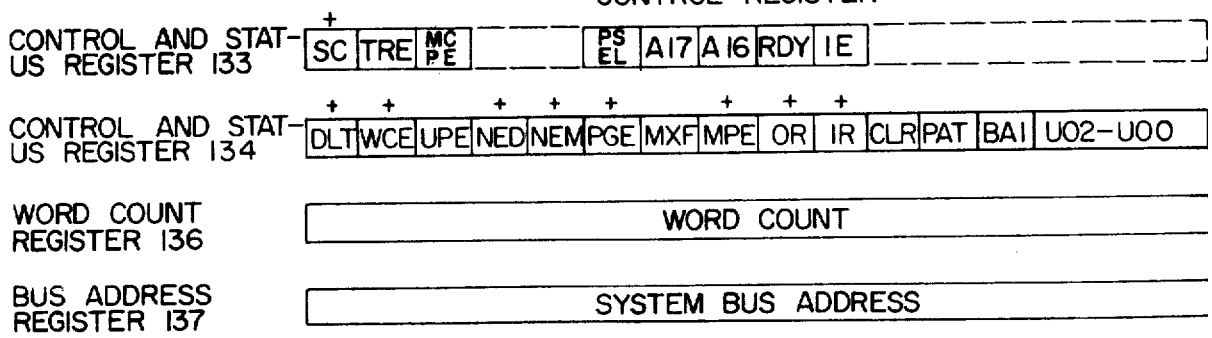
FIG. 12 depicts the organization of registers adapted for use in a controller.

The control and status register 133 is a multi-stage or multiple bit position register. Some stages are located in the controller; others are located in each drive in what is designated the control and status register 140. The controller stages are shown in FIG. 12. One such stage is an SC stage which is set to indicate that (1) a transfer related error has occurred (i.e., a TRE bit position is set), (2) that an MCPE bit position has been set because a parity error was detected during a remote register reading operation as previously discussed, or (3) that some drive connected to the controller has produced an ATTN signal on the wire 94 in the control set 83 (FIG. 4). The controller resets the SC bit position in response to a system resetting (INIT) signal on the wire 95 in the control set 83, to a controller clearing signal which sets a CLR bit position in a control and status register 134 or in response to the correction of the condition causing the drive to assert the ATTN signal. This stage is located in the controller itself.

The TRE stage is a read/write stage in the register 133. It is set in response to the occurrence of a transfer related error signalled by certain stages in the control and status register 134 or in response to the simultaneous assertion of EXC and EBL signals on the wires 110 and 111 in the control set 104. The previously discussed INIT and CLR signals can reset the stage. In addition, the system can clear the TRE bit position by means of a local register writing operation.

As previously indicated, the controller checks the parity signal on the wire 85 in the data set 81 (FIG. 4). If a parity error is detected, the MCPE bit position is set. The MCPE stage is a read only stage. Both INIT and CLR signals cause it to be cleared. A local register writing operation may also clear this stage.

A PSEL bit position is used when the synchronous data path can be selectively coupled to either of two system buses. It is cleared when the selected system bus is also the bus which connects to the control data path. When this stage is set, data is routed to the other system bus. An INIT or CLR signal or a local register writing operation will clear the stage to thereby restore the connection between the system bus which connects to the control data path.

The control and status register 133 shown in FIG. 12 also contains A17 and A16 bit positions which are read/write stages. These positions can augment the contents of the bus address register 137 if the address is not sufficient uniquely to identify a location. Either the INIT or CLR signal or a local register writing operation can clear these two bit positions.

An RDY bit position indicates the condition of the synchronous data path in the controller and comprises a read/write register stage. It sets when power is applied and at the completion of each transfer operation over the synchronous data path. Whenever a data transfer function is received in the register 133 with the GO bit set, the RDY stage is reset.

An IE bit position is set by a local register writing operation to cause the controller to interrupt the system connected to the system bus 120 in response to the assertion of a RDY or ATTN signal. It enables other controller circuits to respond to various error conditions or to the completion of an operation to produce an interrupting signal. This bit position is reset when the system interruption circuitry recognizes the interruption or in response to an INIT or CLR signal. If a local register writing operation resets this stage, the controller can not interrupt the system and any pending interruptions are cancelled.

Several FUNCTION signals designate a specific operation the drive is to perform. They are received by the controller, although the corresponding register stages are located in the control and status register 140 in each drive. These signals define various functions which may involve a data transfer. The register stages are cleared by an INIT or CLR signal. A DRIVE CLEAR operation defined by the FUNCTION bits causes the stages to be cleared. Typical FUNCTION signals also produce the previously discussed READ, WRITE and WRITECHECK operations or a SEARCH operation to locate a particular area in the drive without a data transfer taking place.

When a GO bit position is set, the drive performs the operation identified by the FUNCTION bits. The INIT signal will clear the GO bit and abort any operation in response to a command. The GO bit is also cleared when an operation over the synchronous data path is completed. Setting the GO bit also can reset various error condition bit positions as discussed below.

2 Control and Status Register 134

All stages in the control and status register 134 are located in the controller. Individual register stages reflect the operation and status of the controller, especially error conditions which might exist. A DLT bit position is one example of such a stage which is set when the controller is not able to supply or accept in a timely fashion a data word over the synchronous data path during a writing or reading operation, respectively. In a two-port operation when the PSEL stage in the system 133 is set, an INIT signal at the second system bus also sets the DLT stage if a transfer is then occurring over that second bus. Any time the DLT stage sets, the TRE stage in the register 133 is set.

A WCE bit position is set during a WRITE CHECK operation when the recorded data from the drive does not match the corresponding word in a memory location in the system. This stage sets the TRE stage in the register 133.

A UPE bit position is set during a data transfer in response to a WRITE or WRITE-CHECK command over the synchronous data path when a parity error is detected on the system bus 120. The TRE stage also sets in response to such a parity error.

An NED bit position indicates a non-existent drive and is set by the controller as described with reference to FIGS. 8 and 10. This also causes the TRE stage to be set.

If a system location specified by the controller does not exist, the controller senses an incompleted transfer operation and thereby sets an NEM bit position and the TRE stage.

When the system sends a READ, WRITE or WRITE-CHECK command while the controller is already involved in another transfer, the controller sets a PGE bit position in the register 134. This causes the TRE stage to set.

Any time a drive does not respond to a data transfer command within a predetermined time, the controller sets MXF and the TRE bit positions.

An MPE and the TRE bit positions set if the controller detects a parity error during a transfer over the device bus in response to a READ or WRITE-CHECK COMMAND.

All the foregoing stages in the register 134 can be cleared by any one of four procedures. First, a system resetting signal clears the stages. Secondly, the system can issue a clearing command to set the CLR bit position as discussed later. Thirdly, the system can load the register 133 with the combination of FUNCTION bits which designate a data transfer operation and set the GO bit position. Finally, a word can be loaded into the register 133 which clears the TRE bit position. In addition, the UPE and MXF bit positions can be cleared directly by a local register writing operation.

OR and IR bit positions in the register 134 are used in diagnostic operations and are set when the output buffer register 124 is full or the input buffer register 122, in the synchronous data path is empty.

A system resetting signal, a local register writing operation to set the CLR bit, or an operation for reading the information in the respective buffers clears the OR stage or sets the IR stage.

Sometimes it is desirable to use either even or odd parity coding during a transmission over the data paths. A PAT bit position in the status register 134 can be set to produce even parity coding and decoding and reset to produce odd parity operations. A local register writing operation alters the state of the stage.

Normally the bus address register 137 is incremented or altered during each transfer to identify system locations in succession. A BAI stage in the register 134 can be set during a local register writing operation to inhibit the incrementing steps, provided the controller is not then involved in a data transfer. This condition is indicated when the RDY stage is set. Either a system resetting signal or CLR signal can clear the BAI stage.

The U02 through U00 bit positions receive their information during a local system writing operation. These stages are cleared in response to a system resetting signal or to a CLR signal. Once a transfer starts, they can be altered without interfering with the transfer.

3 Word Counter Register 136

The word counter register 136 initially stores the initial word count, i.e., the number of words to be involved in a data transfer. The number stored is usually the two's complement of the actual word count and the register, which is a counter, is incremented during each transfer of a word over the synchronous data path between the controller and the system. When the register 136 reaches ZERO (i.e., the register overflows or issues a CARRY), the requested transfer is finished. This register can only be cleared by transferring a ZERO value to it through a local register writing operation.

4 Bus Address Register 137

Locations in the system from which data is retrieved or to which data is sent over the synchronous data path are identified by the bus address register 137. The A16 and A17 bit positions in the register 133 augment this information as noted above. The register 137 is a counter which is incremented in response to each data word transfer in order to identify the successive locations corresponding to the successive words involved in a transfer operation. Either a system resetting or CLR signal clears the register 137.

5 Data Register

A data register can be addressed, primarily for diagnostic purposes although may be no physical register. Specifically, if the data register is addressed during a local register writing operation and the IR signal indicates that the storage facility 123 is not full, the information on the control data wires 84 is loaded into the input buffer 122 (FIG. 6). This condition is represented by an OBin signal. On the other hand, an OBout signal is produced when the data register is addressed during a local register reading operation and OR signal indicates that data is present. The OBout signal causes the information in the output buffer 124 to be loaded onto the system bus 120.

6 Status and Control Register 140

Figure 13:
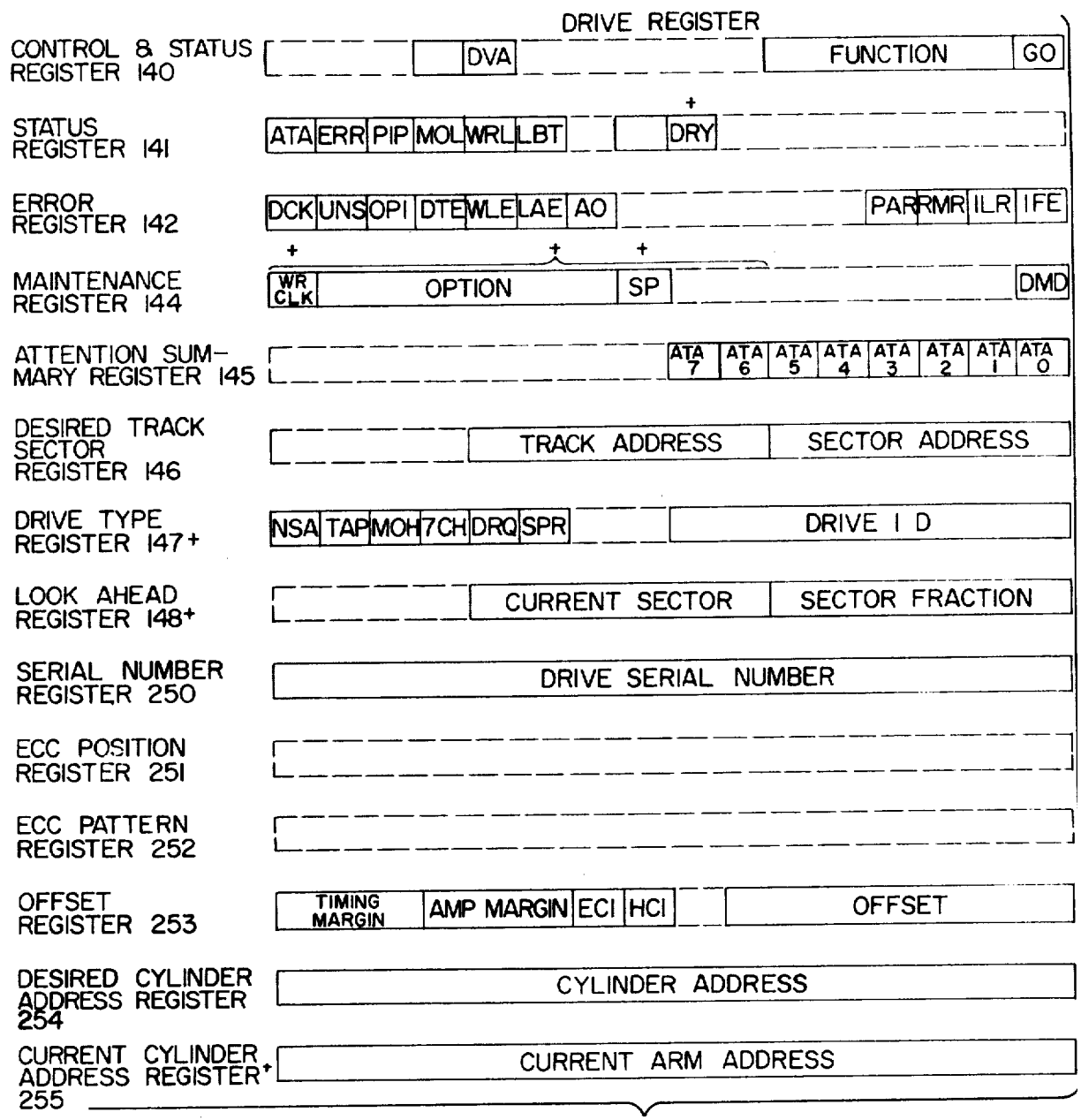
FIG. 13 depicts the organization of registers adapted for use in a drive.

Now referring to FIG. 13, which contains in diagrammatic form, the organization of typical registers in a drive, the control register 140 stores the FUNCTION and GO bits previously described with respect to the control and status register 133. Whenever the register 133 is loaded, the controller produces a remote writing operation to load FUNCTION and GO bits into corresponding stages in the designated drive. A DVA stage is set whenever the drive is available for operation and is a read-only position.

7 Status Register 141

The status register 141 contains the status of the drive. The contents of any bit position in the register 141 are dependent only upon monitoring circuits within the drive. This register cannot be loaded from the controller.

Within the register 141, an ATA bit position and an ERR bit position are related. The ERR bit position is set whenever any other stage in the error register 142 sets. This, in turn, sets the ATA bit position in the drive, which is also set whenever operations in response to a SEARCH command are complete. A system resetting or a CLR signal will clear the ATA and ERR stages. It is also possible to clear the ATA stage by clearing the corresponding location in the attention summary register 145 as described later or by using a local writing operation to transfer a new command to the drive which sets the GO bit position. The last two methods do not clear the error indicators themselves.

Whenever an operation in response to a SEARCH command is in progress, a PIP stage is set. Seeking operations, as apparent, are applicable only to a moving-head disk memory or equivalent units. Once the operation is completed, this stage is cleared.

Still referring to the register 141, MOL and DRY stages are set when the drive is in an operating condition; that is, the MOL stage is set when the drive power is on and, in the case of a continuous moving medium such as a disk or drum, the medium is up to speed. The DRY stage is set to indicate that the drive can accept a command while the drive is not in an operating condition; the DRY bit position is cleared in response to a data transfer command with the GO bit position set. Any change of state of the MOL stage also causes the ATA stage in the drive to be set.

A WRL stage is set whenever an address in the desired track/sector register 146 identifies a track which is protected against writing operations. Otherwise, this stage is cleared.

An LBT bit position is set during a transfer over the data set 101 (FIG. 4) to or from the highest sector (i.e., the "last" sector) on a drive. This stage can be cleared by a system resetting a CLR signal, by transferring a new address into the register 146 or by clearing the drive.

8 Error Register 142

Now referring to the error register 142, a DCK bit position is set whenever circuitry in the drive detects an error during a reading operation over the data set 101 in response to a READ or WRITE-CHECK command.

If the power supply voltage for the drive falls below a safe level, a UNS stage sets; it is reset only when the supply voltage is above the minimum safe level.

During a data transfer operation circuits in the drive monitor index marks on the medium. If some number (e.g., three) of index marks pass after a data transfer command and the RUN signal is still absent, an OPI stage is set indicating a controller failure. In a disk unit, the passage of the number of index marks signifies more than two disk revolutions. If a SEARCH command does not terminate within two disk revolutions, a drive failure has occurred and the OPI stage is also set.

The occurrence of any timing fault, such as the loss or addition of index or clock pulses, causes a DTE stage to set.

If the WRL bit position in the register 141 is set and a writing operation is attempted, the drive sets a WLE stage.

A remote transfer which loads a non-existent address into the desired track address register 146 causes the drive to set a IAE stage.

An AO bit position is set if, when the last block of the last track of a disk is read, the word counter register 136 in the controller does not indicate that the transfer is finished.

Any time a parity error is detected, either on the synchronous data path or the asynchronous control path, a PAR stage in the error register 142 sets.

If the GO bit position in the register 140 is set and the system attempts to load the control register 140, the error register 142 or the desired address register 146, an RMR stage sets.

Whenever the register selection (RS) signals do not identify a register in a designated drive, the drive sets an ILR stage.

FUNCTION bits which define an operation that the drive cannot perform cause an ILF bit position to be set.

The error stages are set immediately upon the condition being detected. This may result, in some cases, in an immediate interruption of the system, or in an interruption at the end of the complete transfer. In either case, the drive asserts the ATTN signal at the appropriate time to initiate the interruption. With the exception of the UNS stage, the other stages can be cleared by a system resetting signal or CLR signal or in response to a remote register writing operation designating the register 143. In addition, a DRIVE CLEAR command code sent to the register 140 clears the corresponding stages in the designated drive.

9 Maintenance Register 144

The maintenance register 144 is used for various diagnostic operations to facilitate an analyses of facility operation. It may contain, for example, a WRCLK bit position or stage to aid in simulating drive clocking pulse, an SP bit position to aid in simulating a sector or block pulse and other similar bit positions. Usually the maintenance register also contains a DMD bit position to place the drive in the maintenance or diagnostic mode of operation when that stage is set.

10 Desired Track/Sector Address Register 146

In the track/sector register 146 TRACK ADDRESS and SECTOR ADDRESS bit positions identify, respectively, the track and sector on a disk to be involved in a transfer. In a fixedhead unit, the TRACK ADDRESS bits identify a specific head. The register 146 can be incremented by successive sector signals so that successive sector and tracks can be involved in a transfer. When the last track and sector address allotted to any specific drive have been identified, the LBT stage in the status register 141 is set. The contents of the register 146 can be reset in response to system resetting or CLR signal or a DRIVE CLEAR command.

11 Drive Type Register 147

The drive type register 147 contains preset values to identify the nature of the drive. It might contain, for example, an NSA bit position to indicate a drive which does not use sector addressing or a TAP bit position to indicate a tape, rather than a disk, drive. An MOH bit position indicates whether a disk is a moving head disk while a 7CH bit position indicates, on a tape unit, whether the tape has seven or nine channels. A DRQ stage could indicate that a drive connects to two controllers. Sometimes a given drive might have a slave drive and an SPR bit position could indicate the presence of such a drive. DRIVE ID bit positions might identify the drive type and major variations.

12 Look-ahead Register 148

The look-ahead register 148 is a counter which contains the sector address of the sector currently passing beneath the read/write heads in CURRENT SECTOR stages. SECTOR FRACTION stages are incremented periodically to identify the fractional portion of the sector which has passed the heads. This information can be used in reducing disk latency times to thereby improve disk transfer rates.

The remaining registers shown in FIG. 13 are not necessary for the operation of a fixed head disk unit such as shown in FIG. 6. They are, however, useful in the operation of other drives and may be incorporated in them.

13 Drive Serial Number Register 250

For example, it may be desirable to include a drive serial number register 250 in magnetic tape drives or drives with removable disks. The contents of the register will then identify the drive unit during regular operation or during maintenance operations. The contents might be recorded in binary coded decimal notation.

14 Error Correction Code Register 251 and 252

The function of the ECC position and the ECC pattern registers 251 and 252 shown in FIG. 13 has been discussed previously. The use of these registers with error-correcting code drives is known. The position and pattern are stored directly in the respective registers. They can be read through a remote register reading operation.

15 Offset Register 253

FIG. 13 also shows an offset register 253. TIMING MARGIN and AMP MARGIN bit positions are useful in providing timing and amplitude offsets for various operations. If an ECI bit position is set and the drive has an error-correcting code function, the function is inhibited. Similarly, setting an HCI bit position inhibits header comparison circuits. OFFSET bit positions contain the actual offset value to provide a proper incremental positioning of the read/write heads over the medium.

16 Desired-Cylinder and Current-Cylinder Address Registers 254 and 255

Two other registers useful in moving head disk memory units are a desired-cylinder-address register 254 and a current-cylinder-address register 255. The drive moves the heads to the track identified in the desired-cylinder-address register 254 and then transfers the contents of the register 254 into the current-cylinder-address register 255. The register 255 then identifies the actual head position and is useful, for example, in determining the relative times necessary to move the heads from a current position to other positions.

17 Attention Summary Register 145

A status register 141 in each drive contains an ATA stage as previously described. The information in this stage can be transferred onto the data set 81 during a remote reading operation in which the register 141 is identified. Each ATA stage in each drive is a stage in the attention summary register 145 which has its own remote address. That is, within the register 145 there is a correspondence between the position of each stage (i.e., the wire in the control data wires 84 which receives the output of the ATA stage) and a drive, each ATA stage being coupled to a unique wire when the attention summary register is read.

Figure 14:
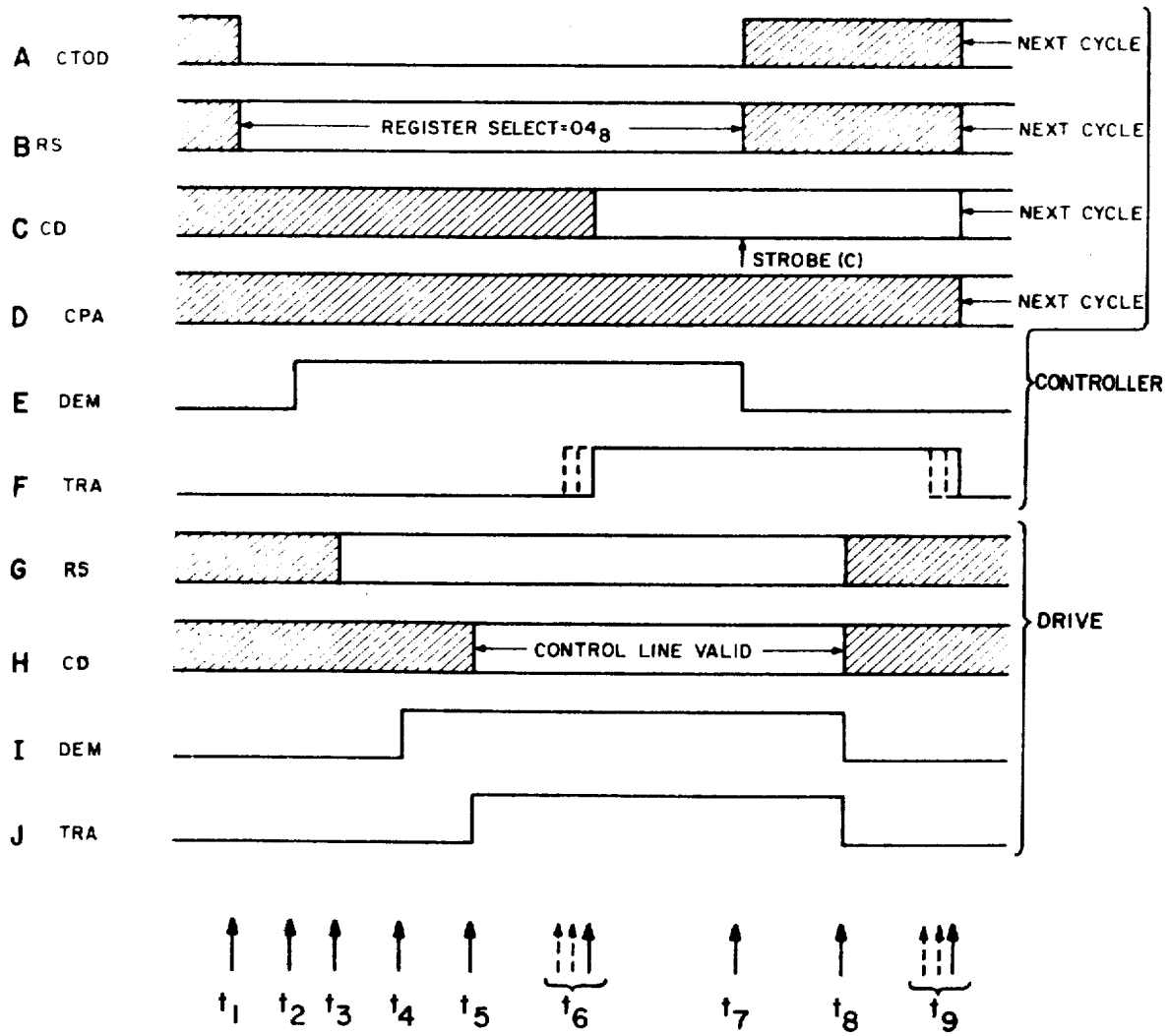
FIG. 14 includes timing charts for retrieving information from a specific register.

Whenever any stage in an error register 141 sets, its corresponding ATA stage sets. This causes the drive to issue an ATTN signal onto the common ATTN wire 94 to thereby cause system operations to be interrupted. One of the first operations in the ensuing interruption routine is the reading of the attention summary register 145. This reading operation is essentially the same as shown in FIG. 8. In this specific operation, however, the address circuit 151 produces RS' signals with a value of $04_8$, and the RS signals from the output drives 161 have the same value. The controller performs steps 200 through 202 as shown in FIG. 8 and by charts 14A, 14B and 14E at times $t1$ and $t2$ in FIG. 14. After a delay, the signals are received by all the drives on the device bus at time $t3$. Now each drive uses step 204 to branch to step 205 because the DS signals have no meaning. As the RS signals identify register $04_8$, step 205 causes step 206 to transfer the output of the ATA stage in each drive status and control error register 141 onto a corresponding wire in the data set 81 sometime after the DEM signal arrives at $t4$. At time $t5$ in Chart 14J each drive transmits its TRA signal and the controller receives all of these in some time interval shown as time $t6$ in Chart 14F.

Several different signals may be received; however, the controller, while processing them, disables step 217 so the controller timing interval is completed by time $t7$. Then, in step 221, the controller branches to step 223 and reads the data at time $t7$ as shown in Chart 14C thereby transferring the ATA signals from all drives to the controller. This is also the time that the controller may terminate the DEM signal as shown in step 214, so that at time $t8$ the control information is removed and the drives all terminate their respective TRA signals. Then, the reading operation is completed, as previously described, by time $t9$. Thus, when the reading operation is completed, the system "knows" exactly which drive or drives sent ATA signals and can immediately begin reading their respective error registers or other registers without any intervening polling operations.

Once all the interrupting drives have been serviced, it is necessary to reset each of the respective ATA stages. This may be done with a writing operation which is similar to that shown in FIG. 10, a specific timing sequence being shown in FIG. 15. At time $t1$, step 226 loads an appropriate CTOD signal, RS signals with a value $04_8$ and the control information including a parity bit onto their respective wires in the control section 80. At time $t2$ the DEM signal is loaded onto the bus (step 228). The first control signals are received at $t3$ and the DEM signal is received at $t4$, the timing of these signals is shown in Charts 15A, 15B, 15C, 15D, 15F, 15G and 15H. Each drive may respond to the receipt of the DEM signal by transmitting a TRA signal. An ATA stage in each error register also resets at time $t5$ as shown in FIGURE Charts 15G and 15I if a corresponding signal on a control data wire 84 is asserted. Again, the controller awaits for the completion of the time interval, because in step 246 the controller senses the value of the RS-signals. At time $t7$ the control signals and control data signals shown in Charts 15A, 15B, 15C and 15D are terminated by the controller and the cycle is completed as in a normal remote register writing operation.

IV. Synchronous Data Path

All the foregoing transfers to local and remote registers are in the nature of "overhead" transfers which provide the necessary control and status information to effect a transfer of data between the system connected to a system bus and a drive connected to the device bus. Certain operations in response to FUNCTION bits loaded into the control and status registers 133 and 140 (FIGS. 6 and 7) do not involve data transfers. These are summarized later. As previously discussed, there are three basic operations which do involve such data transfers and which are known as data transfer commands. They include (1) a reading operation which transfers data from the drive into the system in response to a READ command, (2) a writing operation which transfers data from the system into the drive in response to a WRITE command and (3) a write-check operation during which data stored in the drive and corresponding data in the system are compared to determine whether there were any writing errors in response to a previous WRITE command.

Figure 5:
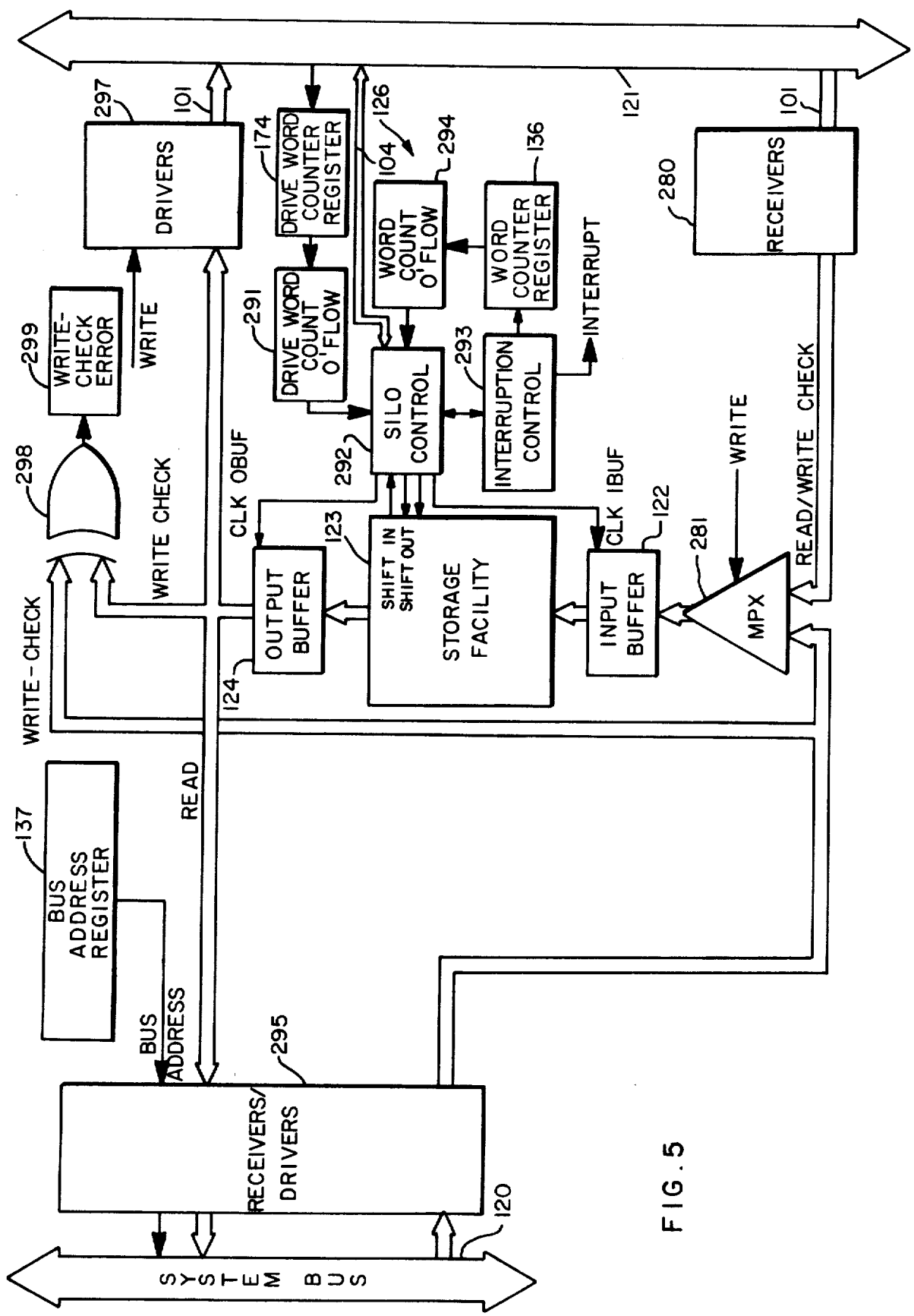
FIG. 5 is a block diagram of a synchronous data path in the controller as adapted for connection to a system as shown in FIGS. 2 or 3.

There are, as previously indicated, several preliminary drive control path transfers which precede the issuance of any of these data transfer commands. The starting system address must be loaded into the bus address register 137 in the controller (FIGS. 5 and 6). For purposes of this explanation, it is assumed that the A16 and A17 bit positions in the control and status register 133 (FIG. 12) are included in the register 137 as described above. Both the word counter register 136 and the drive word counter register 174 receive a number representing the total number of words to be transferred. The address register 146 in FIG. 7 will contain sector and track addresses and a moving-head disk will contain the desired track address in the desired-cylinder-address register 254. Once this information has been received by the controller and the designated drive, the system can issue a data transfer command through a register writing operation.

A. READ Command

Now referring to FIGS. 5, 6, 7, 16 and 17, the system loads the READ command into the control and status registers 133 and 140. Thus, the FUNCTION bits now define a reading operation and the GO bit is set. This operation is represented as step 250 in FIG. 16. Step 251 represents the process of transferring the READ command into the controller and establishing various paths. In step 252 the controller issues a RUN signal on the RUN wire 107 in the control set 104 at time $t2$ (Chart 17B).

At time $t3$ the RUN signal is received at the drive (Chart 17F). By that time the drive has received the READ command (step 253) and determined the presence in the error register 142 of any preexisting errors. If any such error does exist, step 254 branches to step 255 to clear the GO bit in the drive, set the DRY bit and ATA bit and produce the ATTN signal on the wire 94. No further action occurs in the drive. Normally, however, there are no previous uncorrected errors. Step 254, therefore, branches to step 256, whereupon the ATA bit position, if previously set, is reset and the DRY bit position is reset unconditionally to enable the drive.

All of these operations may be completed before the drive receives the RUN signal at time $t3$ (Chart 17F). Steps 257 and 260 are enabled by the receipt of the command to ensure that the RUN signal is received within a predetermined interval. If it is not, the drive sets the OPI bit in the error register 142 (step 261). Again, step 257 normally branches to the remaining steps in the FIG. 16 to produce the reading operation.

Looking now at FIG. 7, a drive control circuit 262 and a transport and medium 263 control perform the actual reading operation. The drive control circuit 262 responds to the desired address in the register 146 by either selecting or positioning the appropriate reading means. A timing head in the transport and medium 263 and a timing amplifier 264 sense timing marks which a timing signal generator 265 and a sector address counter 266 convert into sector numbers. The sector address from the counter 266 is coupled to the look-ahead register 148 and to a sector address comparison circuit 267. When the desired sector, identified by signals from the register 146, is reached, the comparison circuit 267 enables the drive control circuit 262 to begin retrieving data from the medium 263.

During a reading operation, the data appears serially at the input to a shift register 270 to be converted into parallel form. A CRC testing unit may also receive these data signals to produce a cyclic redundancy check word for use as known in the art. Signals from a format counter 272 provide various timing and signal modification functions for the specific transport and medium being used in the drive. From the shift register 270, the data passes into a data buffer 273 and then is clocked onto the data wires 102 on the leading edge of a SCLK pulse on the wire 105. The data parity wire 103 receives a parity bit from a synchronous bus parity circuit 274. A bus control circuit 275 receives the RUN signal on wire 107 and may send or receive the EXC signal on wire 111.

Figure 16:
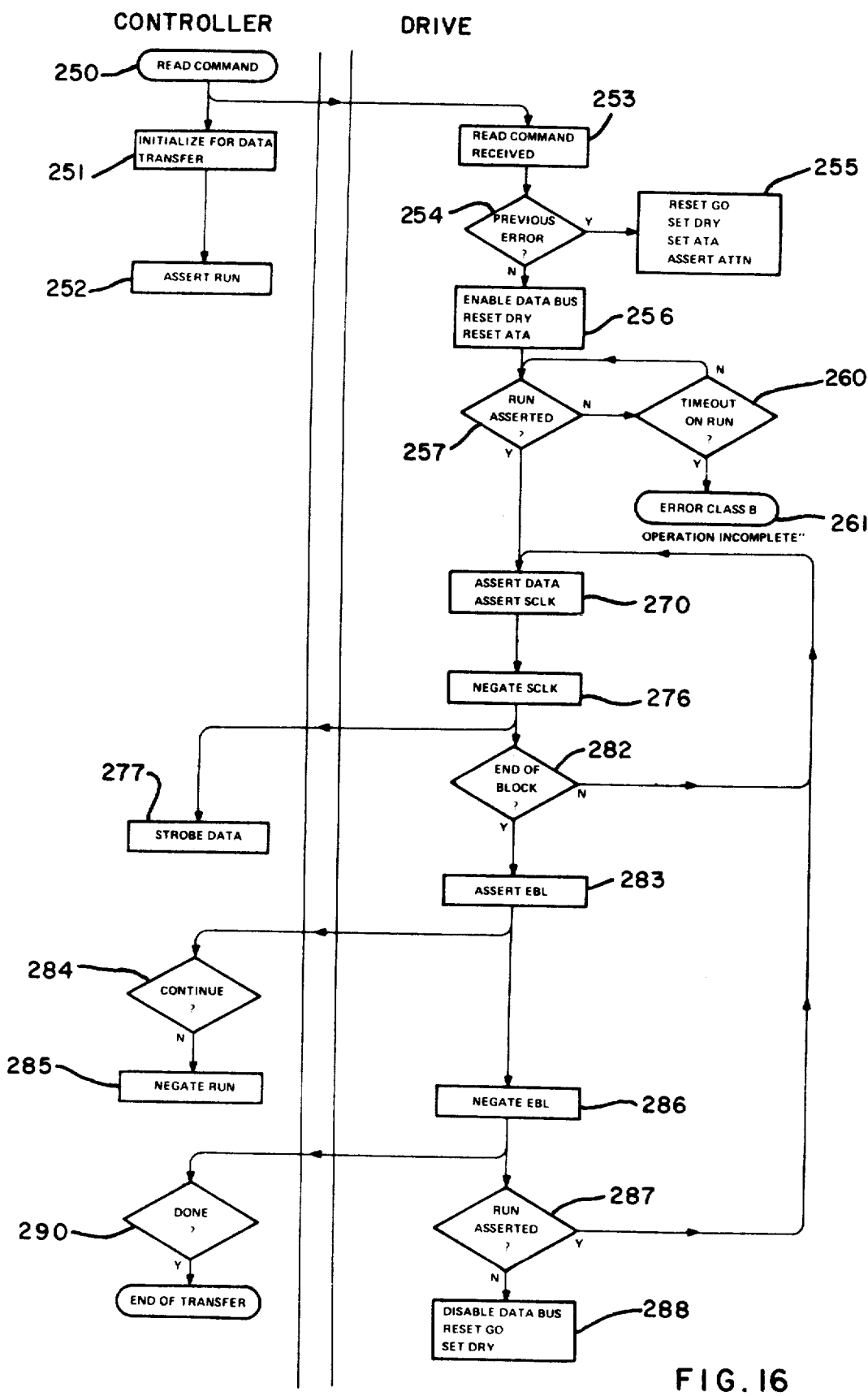
FIG. 16 is a flow chart of the operation of a controller and drive to retrieve data from the drive.

The drive begins transmitting data starting with step 270A in FIG. 16 at time $t4$ in Charts 17B and 17H on the leading edge of the first SCLK pulse. The first word of data and the parity bit then appear on the data and parity wires 102 and 103. At time $t5$ both the SCLK signal and the data arrive at the controller as shown in Charts 17A and 17D. At $t6$ Chart 17H shows that the SCLK pulse terminates at the drive (step 276) with the controller sensing that transition at $t7$ (Chart 17D). This transition causes the controller to read in the data on the data wires 102 and the data parity wire 103 during step 277 with the SCLK pulse terminating midway through the time interval that the data normally is present.

When the SCLK signal is asserted again by the drive at time $t8$ (Chart 17H), the next data word is transmitted onto the data wires and the cycle repeats with successive words being loaded into the controller. At the controller, the data passes through enabled receivers 280 and a multiplexer 281 which responds to the absence of a WRITE signal to couple the receivers 280 to the input buffer 122.

Figure 17:
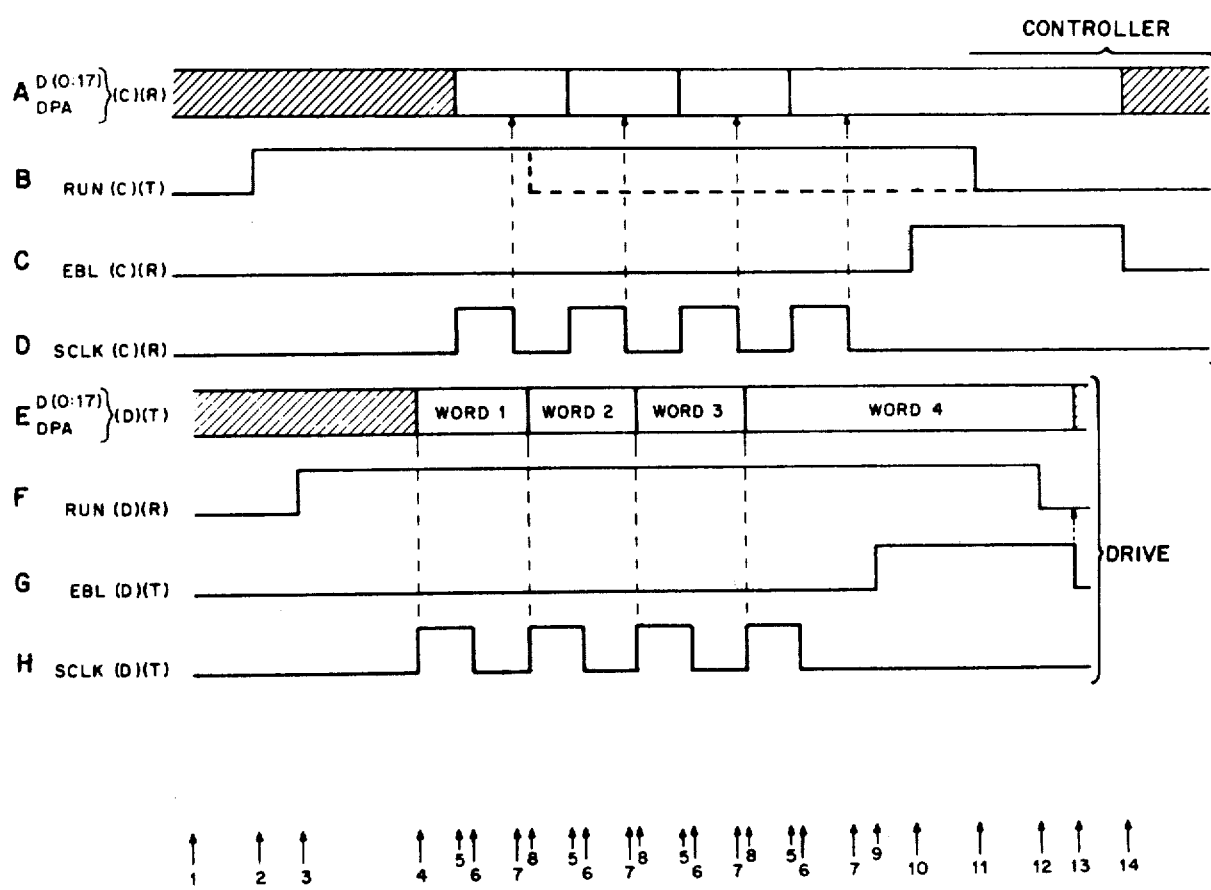
FIG. 17 includes timing charts corresponding to FIG. 16.

As successive words are received at the input buffer 122, they pass in succession into the first-in-first-out memory 123 and, under the internal timing of that memory 123, reach its output. As shown in Chart 17H, the EBL signal has not been received at the controller by time $t8$ so step 282 branches back to step 270 and the next word on the medium is transferred. For each data word transfer, the drive uses the same sequence at times $t8$, $t5$, $t6$ and $t7$ as shown in FIG. 17. When the last word in each sector has been transferred, step 282 branches to step 283, and the drive transmits a fixed length (EBL) pulse onto the EBL wire 110 at time $t9$ (Chart 17G). At time $t10$ the controller receives the EBL signal (Chart 17C). If the drive word counter register 174 indicates the transfer is to continue for another block, no further action occurs in the controller. When the transfer has been completed, as indicated by an overflow of the register 174, step 284 branches to step 285 and terminates the RUN signal at $t11$ (Chart 17B).

The EBL signal terminates in step 286 at time $t13$ (Chart 17G). Termination in the absence of a RUN signal at that time causes step 287 to branch to step 288 and the transfer stops. In step 288 the drive resets the GO bit and sets the DRY bit indicating that the drive is ready to receive another command. If the RUN signal is still asserted at $t13$, step 287 branches back to step 270 and the next sector is transmitted.

When the EBL signal terminates at $t13$, it is sensed at the controller at $t14$ (Chart 17C). If the RUN signal has been terminated, the transfer is finished and step 290 branches to complete the reading operation. Otherwise, the controller is maintained in condition to accept more data.

The EBL signal is relatively prolonged so as to ensure that when a transfer is completed, the RUN signal will terminate before the end of the EBL signal and thereby prevent the drive from cycling through an additional, unneeded block of data.

Normally the input buffer 122, the memory 123 and the output buffer 124 are constructed to store some portion of the words from one sector. As already apparent, however, a given transfer may involve more data words or fewer data words than are present in a sector. When the transfer is for fewer words, the drive word-counter register 174, which is incremented in response to each data word transfer from the drive to the controller, produces an overflow which is sensed by an overflow circuit 291 before the EBL signal. However, the data words in the input buffer 122 and memory 123 advance until the first word reaches the output buffer 124, the movement into the output buffer 124, being produced by a memory control circuit 292. When the transfer involves more words than are present in a sector, the control 292 senses when the first word reaches the output buffer.

In either case, the presence of a data word in the output buffer causes the control 292 to activate an interruption control circuit 293 to produce an INTERRUPT signal. This signal interrupts the system and, in response to signals received over the system bus 120, transfers the contents of the output buffer 124 through bus receivers/drivers 295 onto the system bus 120 for storage in a location identified by the bus address register 137. These transfers continue until the word counter register 136 indicates that all the required transfers between the controller and the system have occurred. Then the register 136 overflows and an overflow circuit 294 disables the controls 292 and 293.

Thus, in response to a READ command, the controller and drive transfer the desired number of words from a sector or sectors on the medium onto the synchronous data path and then, using a direct access memory procedure, to the system over the system bus 120. The storage facility 123 accommodates the diverse transfer rates. Its size and operation also ensure that there is sufficient data available for efficient transfers to the system. If the system does not retrieve data quickly enough, other circuits in the control 126, which are not shown, sense the arrival of data at the receivers 280 and the full input buffer 122 to set the DLT bit in the control and status register 134 as previously indicated.

B. WRITE Command

During a writing operation data moves from the system over the data section 100 of a device bus to be stored in a designated drive. A WRITE command from the system initiates the transfer after the word counter register 136, bus address register 137, drive word counter register 174 and other of the status and control registers are loaded, as previously indicated. Drive and controller response to WRITE command can be seen by reference to FIGS. 5, 7, 12, 13, 18 and 19.

Initially the interruption control 293 in the controller produces a series of INTERRUPT signals to transfer data as data words during direct memory accesses from the system bus 120 through receiver/drivers 295 and input multiplexer 281 into the input buffer 122. As the input buffer 122 receives successive data words, the storage control 292 transfers them into the storage facility 123 until the storage facility 123 fills and a data word appears in the output buffer 124 or until the word counter register 136 indicates that all data words to be transferred to the drive are in the controller. In the second case, the data words also shift through the storage facility 123 until the output buffer receives a word.

When the output buffer 124 first receives a data word, the controller may begin a transfer to the drive because the output buffer 124, the storage facility 123 and the input buffer 122 contain a plurality of storage locations. A WRITE signal, produced in response to the FUNCTION bits, enables drivers 297 to load data onto the data set 101 which includes data wires 102 and data parity wire 103. Then the sequence shown in FIGS. 18 and 19 begins.

At time $t1$ the drive and controller have received the WRITE command (step 300). Between time $t1$ and time $t2$, the controller prepares itself and the drive for the data transfer (step 301). At time $t2$, the controller enables the drivers 297 to load the first word of data onto the data section 101, as shown in Charts 19A and B and in step 302. At the same time, the control 126 transmits a RUN signal onto the RUN wire 107 as shown in step 303 and Chart 19B. The data reaches the drive over the data section 101 at time $t3$ (Chart 19F). The interval from time $t2$ to time $t3$ represents bus transfer delay times.

Figure 18:
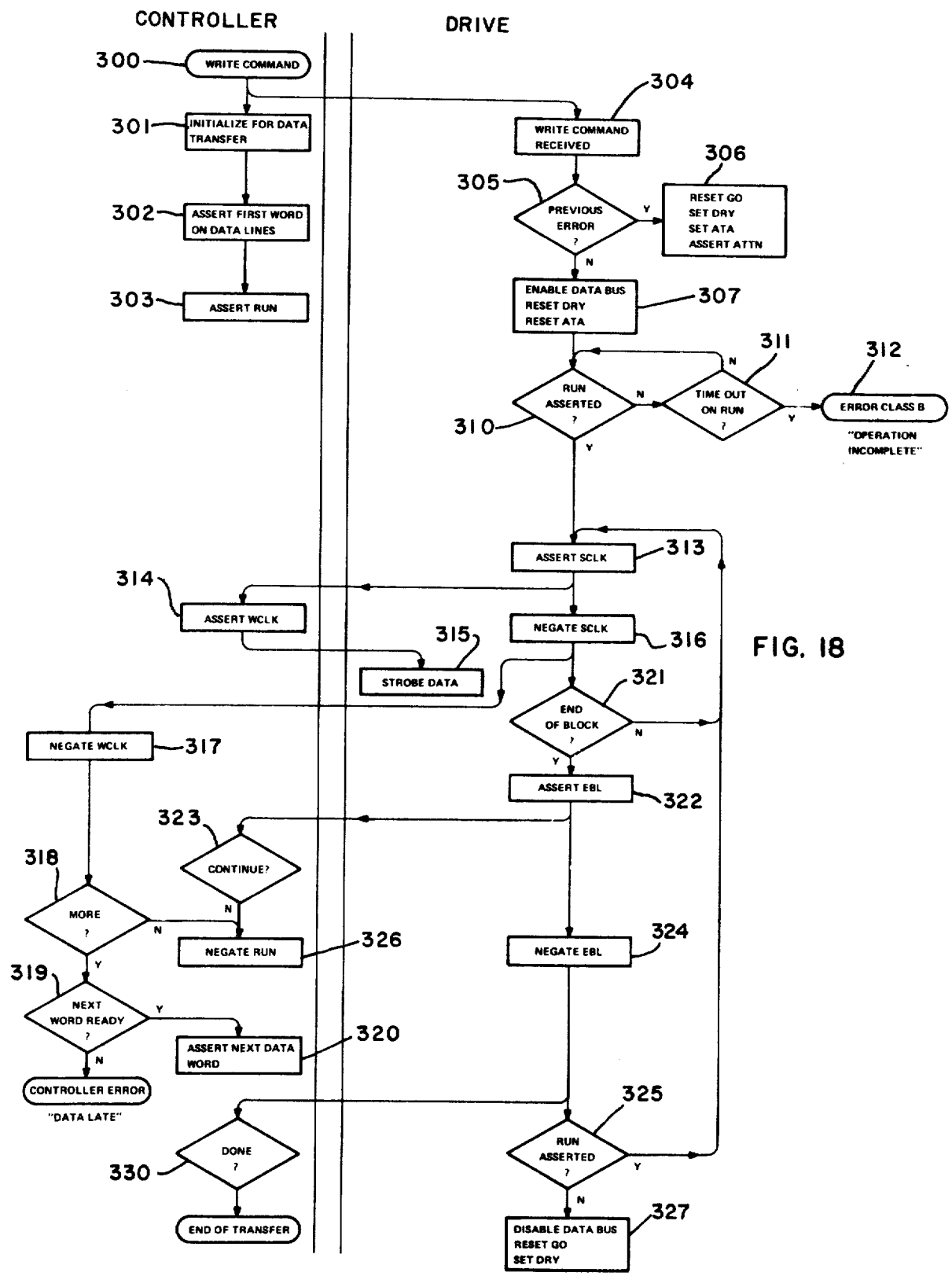
FIG. 18 is a flow chart of the operation of a controller and device bus to store data in the drive.
Figure 19:
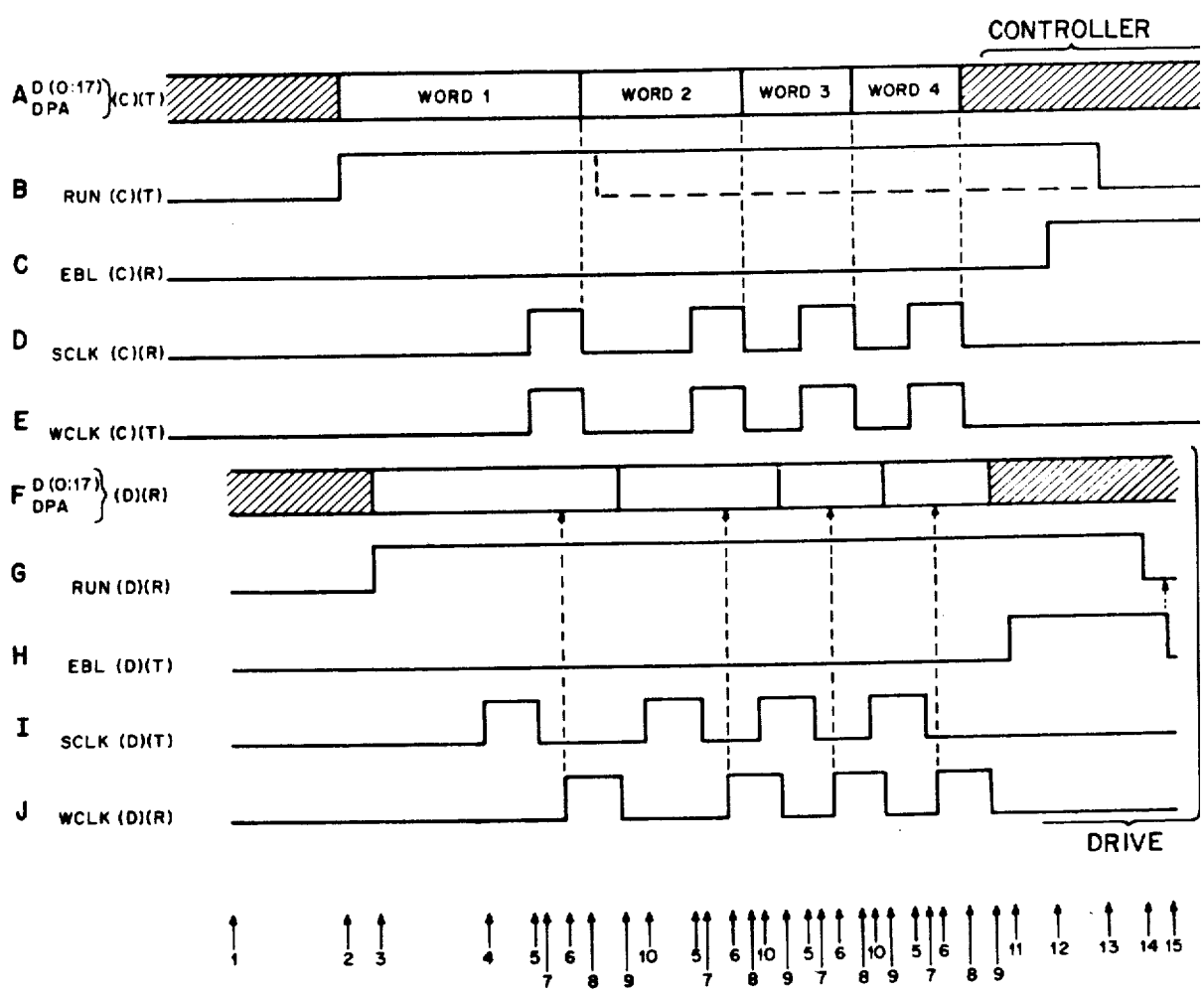
FIG. 19 includes timing charts corresponding to FIG. 18.

Step 304 in FIG. 18 indicates the receipt of the WRITE command 304. Steps 305, 306 and 307 are analogous to steps 254, 255 and 256 in FIG. 16, and they properly condition the contents of the DRY and ATA bit positions in the status register 141, the GO bit position in the control register 140 and the signal on the ATTN wire 94. Like steps 257 and 260 in FIG. 16, steps 310 and 311 insure that the RUN signal on the wire 107 is received within a predetermined time interval to avoid a system malfunction. If a predetermined interval does expire before the RUN signal is asserted (step 312), the OPI bit position in the error register 142 sets.

Normally, however, step 310 branches to step 313 as both the data and RUN signals are received at time $t3$ (Charts 19F and 19G). At time $t4$ the drive issues an SCLK pulse on wire 105 as shown in Chart 19I (step 313). The controller receives the SCLK signal on the wire 105 at time $t5$ and then, at step 312, issues a WCLK signal onto the wire 106 for return to the drive as shown in Charts 19D and E. At time $t6$, the drive receives the WCLK signal (Chart 19J) and stores on the medium the data from the data section 101 (step 315). At time $t7$, the drive terminates the SCLK signal (Chart 19I and step 316). This may occur before or after the receipt of the WCLK signal at the drive. The controller stops transmitting the WCLK signal at time $t8$ (Chart 19F and step 317) in response to the termination of the SCLK signal (Chart 19E). Steps 318 and 319 in FIG. 18 normally branch to step 320 whenever an additional word is in the output buffer 124. If the next word is not in the output buffer, but more words are to be transferred, step 319 branches and sets the DLT bit in the control and status register 134.

Concurrently with steps 317 through 320, the drive performs some control functions. In step 321 the control 126 monitors the drive word counter register 174. If any additional words are to be transferred to the drive, step 321 branches to step 313 and another data word can be stored. The beginning of such a cycle is shown in Chart 19I at time $t10$ when the drive reasserts the SCLK signal on the wire 105. Subsequently, the times $t5$, $t6$, $t7$, $t8$, $t9$ and $t10$ repeat in sequence until the last word in a block has been transferred.

When the drive receives last word in a sector or block, it transmits an EBL signal onto the wire 110 as represented in step 322 and shown at time $t11$ in Chart 19H. The controller receives the EBL signal at time $t12$ (Chart 19C). If, in step 323, the word counter register 136 indicates that additional words are to be transferred from the system, the controller keeps the RUN signal active. Thus, the drive, when it terminates the EBL signal and checks the RUN signal (steps 324 and 325) cycles back to step 313.

When all words have been transferred from the system over the system bus and into the storage facility 123, step 323 branches to step 326 and the RUN signal terminates as shown at time t13 in Chart 19B. The resulting termination is sensed on the wire 107 at time t14 as shown in Chart 19G. As previously indicated, the EBL signal is prolonged so that the RUN signal will always terminate before the EBL signal terminates. The EBL signal at the drive terminates at time t15 as shown in Chart 19H and this transition produces a strobing signal to monitor the RUN signal. As the RUN signal is not asserted, step 325 advances to step 327 to disable the synchronous data section, reset the GO bit in the drive control status register 140 and set the DRY bit in the control and status register 141. At time t16, the controller senses the transition of the EBL signal over the wire 110 and, in step 330, terminates its writing operation.

It is possible that during the transfer operations, the controller will not be prepared to transfer a word through the drivers 297. When this occurs step 319 in FIG. 18 branches and the controller sets a DLT bit position in the control and status register 134.

C. WRITE-CHECK Command

During an operation initiated by a WRITE-CHECK command, circuits in the controller compare the data actually written in a drive with the data contained in the system. This command produces a reading operation at the device bus 121 (FIG. 5) and the data words pass through the input buffer 122, storage facility 123, and output buffer 124. The control 126 also responds to the WRITE-CHECK command by enabling an EXCLUSIVE OR circuit array 298 to receive the data in the output buffer 124 as one input.

When the output buffer 124 contains a word, the interruption circuit 292 generates an INTERRUPT signal to effect a data transfer from locations identified by the contents of the bus address register 137 over the system bus 120 through the receivers/drivers circuit 295 to be a second input to the EXCLUSIVE OR array 298. If any error exists, then the EXCLUSIVE OR array 298 produces a ONE output which a WRITE-CHECK ERROR circuit 299 monitors. The control circuit 126 may then interrupt subsequent operations.

Otherwise the operation is the same as a READ operation in response to a READ command. Successive words from the drive are transferred over the device bus 121. Corresponding words from the system identified by the bus address register 137 are received over the system bus 120 and through the receiver/driver circuit 295 as in a writing operation except they pass directly to the EXCLUSIVE OR array. The word counter register 136 and drive word counter register 174 will terminate the operations and effectively disconnect the controller and the drive as previously discussed.

D. Detailed Synchronous Data Path Control Circuit

Figure 20A:
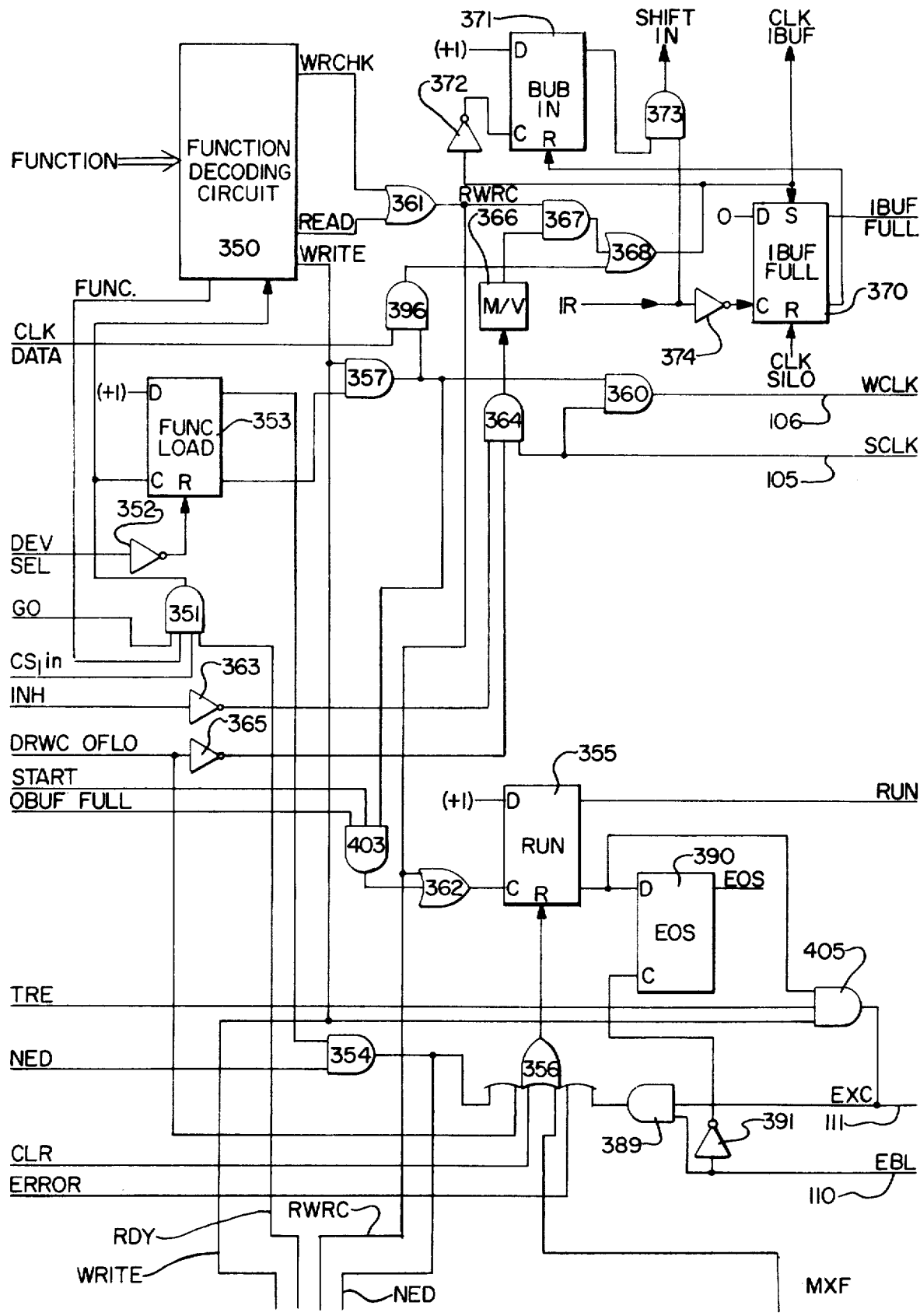
FIGS. 20A and 20B are detailed circuit diagrams of control circuits shown in FIG. 5.
Figure 20B:
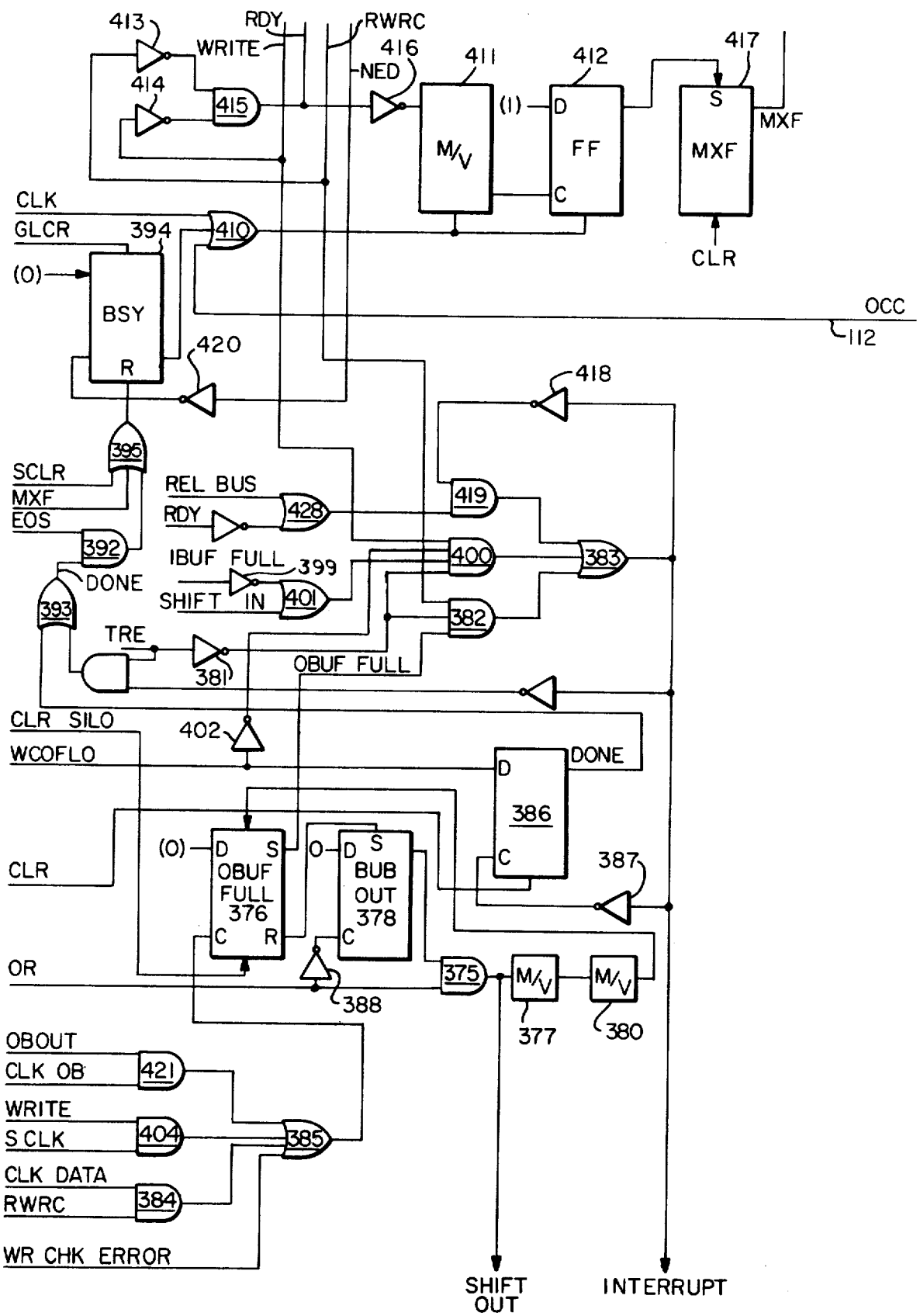

With this understanding of the operation of a controller and drive, it is possible to discuss the controller circuits in more detail. Referring to FIGS. 20A and 20B, a function decoding circuit 350 receives the FUNCTION signals and produces output signals indicating a function to be performed. Basically, the function decoding circuit 350 comprises a decoding circuit for producing a unique command signal in response to each proper combination of FUNCTION signals which define a data transfer command. Each such command signal is applied to an internal storage element to be maintained even after the FUNCTION signals themselves terminate. Specifically, a local register transfer produces FUNCTION signals at the input to the function decoding circuit 350. If the control information being transferred is a data transfer command, the circuit 350 produces a corresponding command signal internally and an output FUNC signal indicating that the FUNCTION bits define a data transfer command. The coincidence of the FUNC signal, a CSlin signal from the register selection decoder 152 (FIG. 6) and a GO signal, produced when the GO bit position in the data transfer command is asserted, energizes an AND gate 351. When address timing circuit 155 (FIG. 6) produces the DEV SEL signal, an inverter 352 removes an overriding resetting signal to a clocked flip-flop 353. As this occurs before the GO signal appears, the output signal from the AND gate 351 sets a clocked flip-flop 353 to produce a FUNC LOAD signal indicating the decoding circuit 350 might be decoding a data transfer command. The trailing edge of the signal from the AND gate 351 corresponds to the termination of the REG STR signal from the timing circuit 156 (FIG. 6). The trailing edge of the signal from the AND gate 351 loads the internal command signal into its appropriate internal storage element, whereupon the function decoding circuit 350 produces a READ, WRITE or WRITE-CHECK command depending upon the state of the FUNCTION bits.

The FUNC LOAD signal, which appears while the flip-flop 353 is set, enables an AND gate 354. If a nonexistent drive has been addressed, the following NED signal from the control and status register 134 (FIG. 12) in the controller passes through the AND gate 354 and an OR gate 356 as an overriding resetting signal to RUN flip-flop 355 which, when set, produces the RUN signal. As described above, the NED signal is generated if a TRA signal is not received a predetermined time interval after a DEM signal.

While the FUNC LOAD flip-flop 353 is set, an AND gate 357 is disabled so a WRITE signal can not be asserted until the controller has checked for a nonexistant drive. After the DEV SEL signal terminates, the inverter 352 again produces the overriding resetting signal for the FUNC LOAD flip-flop 353 to thereby disable the AND gate 354 and enable the AND gate 357.

1 Reading and Write-Checking Operations

Circuit responses to reading and write-checking operations are analogous as both READ and WRITE-CHECK signals are combined in an OR gate 361 to produce a RWRC signal and are not otherwise used separately in FIGS. 20A and 20B.

During a reading operation, data is routed into the input buffer 122 in FIGS. 5 and 6 in response to SCLK signals on the wire 105 from the device bus. Assuming that both a system inhibiting (INH) signal and DRWC OFLO signal are inactive, inverters 363 and 365 (FIG. 20A) enable an AND gate 364. The INH signal is active if a transfer error is detected (i.e., the TRE bit position in the control and status register 133 is set) or the DLT bit position in the control and status register 134 is set. The DRWC OFLO signal is active when the drive word counter register 174 in FIG. 6 overflows indicating that all the transfers between the controller and drive have been completed.

Thus, each SCLK pulse on the wire 105 passes through the AND gate 364 to trigger a monostable multivibrator 366. The OR gate 361 and output pulses from the multivibrator 366 provide the inputs of an AND gate 367. During a reading operation, each pulse from the multivibrator 366 passes through the AND gate 367 and an OR gate 368 to become a CLK IBUF pulse which loads data into the input buffer 122. The leading edge of the CLK IBUF pulse also sets an IBUF FULL flip-flop 370 thereby making an IBUF FULL signal active and removing an overriding resetting signal to a BUB/IN flip-flop 371. When the CLK IBUF pulse terminates, an inverter 372 sets the BUB IN flip-flop 371 to enable an AND gate 373. The other input to the AND gate 373 is an IR signal from the storage facility 123 in FIGS. 5 and 6. The IR signal indicates that the storage facility 123 has a vacant storage location (i.e., is not full). When this IR signal is asserted and the BUB IN flip-flop 371 is set, the AND gate 373 produces SHIFT IN pulse which loads data from the input buffer 122 into the storage facility 123. As soon as the storage facility receives the data, the IR signal terminates, so the SHIFT IN pulse also terminates. This trailing edge of the IR signal passes through an inverter 374 to reset the IBUF FULL flip-flop 370 and thereby reset the BUB IN flip-flop 371 and disable the AND gate 373. Even if the storage facility is not now full, the IR signal terminates momentarily so as to initiate this resetting operation.

The CLK IBUF pulse may also be produced in response to a local register transfer command which identifies the input buffer 122 as the source of data for the control bus as previously described. Other circuitry (not shown) may monitor the IBUF FULL flip-flop 370 to produce the DLT signal to set the corresponding stage in the control and status register 134 if an attempt is made to load data into the input buffer 122 while the IBUF FULL flip-flop 370 is set. Successive SCLK pulses continue to pass through the AND gate 364 until the drive word counter register 174 in FIG. 6 overflows and activates the DRWC OFLO signal. Then the inverter 365 inhibits the AND gate 364. If the INH signal becomes active, further operations are also stopped.

Still referring to a reading operation, the storage facility 123 generates an OR signal when it is ready to shift data to the output buffer 124. The OR signal passes through an AND gate 375 in FIG. 20B when a BUB OUT flip-flop 378 is set. The BUB OUT flip-flop sets each time an OBUF FULL flip-flop 376 resets indicating the output buffer 124 is empty. The coincidence of a set BUB OUT flip-flop 378 and OR signal energizes the AND gate 375 to produce a SHIFT OUT pulse which loads data from the storage facility 123 into the output buffer 124. This pulse also triggers a monostable multivibrator 377, which in turn triggers another monostable multivibrator 380. The output pulse from the monostable multivibrator 380 sets the OBUF FULL flip-flop 376. This removes an overriding setting signal from the BUB OUT flip-flop 378 so the termination of the OR signal after the transfer to the output buffer 124 passes through an inverter 388 to reset the BUB OUT flip-flop 378 and terminate the SHIFT OUT pulse. When the next word appears at the output of the storage facility, the resulting OR signal enables the AND gate 375. However, no transfer can occur until the OBUF FULL flip-flop resets.

When the OBUF FULL flip-flop 376 sets, it energizes an AND gate 382 which is also enabled by an inverter 381 when a TRE signal from the control and status register 133 is not active (i.e., no transfer errors exist) and by a RWRC signal from the OR gate 361 (FIG. 20A). Thus, during a reading operation, AND gate 382 and an OR gate 383 transmit an INTERRUPT signal.

The INTERRUPT signal passes onto the system bus. During a subsequent system interruption operation, the system retrieves the data from the output buffer 124 and transfers it to the system location identified by the contents of the bus address register 137 (FIG. 5). Usually this is accomplished without actually interrupting the operation of the central processor unit. Such transfers are known as direct memory access transfers. Once the data has been received in the system, a CLK DATA signal appears. An AND gate 384 receives the CLK DATA signal during a reading or write-checking operation indicated by the RWRC signal from the OR gate 361, and the resulting signal passes through an OR gate 385 to clock the OBUF FULL flip-flop 376 to a reset condition. This immediately sets the BUB OUT flip-flop 378 so another word can then be moved to the output buffer 124 as soon as the OR signal is asserted, if it has not already been asserted.

Thus, successive SCLK pulses transfer data through the input buffer 122 into the storage facility 123 during a reading or write-checking operation. When the storage facility 123 stores a word, then another word can be loaded into it until the facility is filled. When the storage facility 123 is filled, each word that is moved into the output buffer 124 and transferred to the data processing system enables additional words to pass in sequence into the output buffer. Furthermore, as the storage facility now has more space made available, a subsequent word can be transferred into the storage facility 123 from the input buffer 122. These operations continue until all the words to be retrieved have been transferred from the drive, whereupon the drive word counter register 174 (FIG. 6) generates the DRWC OFLO signal to disable the AND gate 364 through the inverter 365 and reset the RUN flip-flop 355 through the OR gate 356. This effectively disconnects the drive and the controller.

When the word counter register 136 in FIG. 6 asserts a WCOFLO signal, the trailing edge of the INTERRUPT signal, coupled to the flip-flop 386 shown in FIG. 20B through an inverter 387, sets the flip-flop 386 to produce a DONE signal at the output of an OR gate 393. The WCOFLO signal indicates that all transfers between the controller and system bus are finished. Referring to FIG. 20A, with the RUN flip-flop 355 reset, the trailing edge of a subsequent EBL signal, received from the wire 110 through an inverter 391, sets an EOS flip-flop 390 to generate an EOS signal. The coincidence of the EOS signal and DONE signal from the OR gate 393 energizes an AND gate 392 in FIG. 20B. The signal from the AND gate 392 passes through an OR gate 395 to reset a BSY flip-flop 394. The operation of the controller in response to the BSY flip-flop 394 is discussed later.

2 Writing Operations

In a writing operation, data is supplied from the system bus 120 to the input buffer 122. Each time data appears on the system bus, a CLK DATA pulse in response to transfer control signals on the system bus 120 passes through an AND gate 396 enabled by the AND gate 357 (FIG. 20A) and through the OR gate 368 to produce the CLK IBUF signal. Successive CLK DATA pulses in response to successive transfer signals from the system bus 120 move successive words through the input buffer 122 and into the storage facility 123.

Assuming the output buffer 124 is empty, the flip-flop 376 in FIG. 20B is reset and the BUB OUT flip-flop 378 is set. When the OR signal appears, indicating data at the output of the storage facility 123, the enabled AND gate 375 produces the SHIFT OUT pulse as previously discussed, and data moves to the drive. If the storage facility is filled, each transfer to the drive produces a vacant location and frees the input buffer 122.

With respect to transfers from the system, the function decoding circuit 350 produces a WRITE signal which is one enabling input to an AND gate 400. A second enabling signal is from an inverter 402 which receives the WCOFLO signal indicating that more words are to be transferred from the system. The output of inverter 381 also enables the AND gate 400 if no transfer errors have been detected as indicated by the absence of the TRE signal. If thus enabled, the Shift In signal from the AND gate 373 in FIG. 20A or the absence of an IBUF FULL signal from the flip-flop 370 coupled through an inverter 399 causes an OR gate 401 to energize the AND gate 400 thereby to produce an INTERRUPT signal so another word can be transferred from the system bus 120 to the input buffer 122. In operation, the first word is transferred in response to the absence of an IBUF FULL signal. Subsequent words are transferred in response to the SHIFT IN pulse which precede the termination of the IBUF FULL signals.

When the OBUF FULL flip-flop 376 is set during a writing operation, the resulting OBUF FULL signal and a START signal energize an AND gate 403 (FIG. 20A) during a writing operation to energize the OR circuit 362 and clock the RUN flip-flop 355 to a set condition. The START signal is generated by other circuits (not shown) and is asserted after a predetermined number of words are stored in the storage facility 123 and output buffer 124. This assures a minimum number of writing operations will occur before even producing the RUN signal. If, however, all the transfers are completed to the controller, as indicated by the presence of a WCOFLO signal, the START signal is asserted immediately. While the RUN signal is on, subsequently received SCLK pulses on the wire 105 pass through the AND gate 360, enabled by the AND gate 357 during a WRITE operation. The output from the AND gate 360 is a string of WCLK pulses which are coupled to the drive on the WCLK wire 106. Once set, the flip-flop 355 remains set for the transfer of successive words. When the drive word counter register 174 indicates all words have been transferred to the drive, the DRWC OFLO signal resets the flip-flop 355 to terminate the RUN signal. The WCOFLO signal enables the flip-flop 386 to be set upon the trailing edge of the INTERRUPT signal to thereby reset the BSY flip-flop 394, as previously discussed.

Each SCLK pulse on the wire 106 also energizes an AND gate 404 in FIG. 20B during a writing operation to reset the OBUF FULL flip-flop 376. Thus, as each SCLK pulse indicates a transfer during a writing operation, it resets the OBUF FULL flip-flop 376 to indicate that the output buffer 124 is vacant or about to be vacated.

Referring to FIG. 20A, EBL signals on the wire 110 do not affect the controller while the RUN flip-flop 355 is set. If the RUN flip-flop 355 is reset, however, the trailing edge of an EBL signal clocks the EOS flip-flop 390 to a set condition. The EOS signal enables the AND gate 392 in FIG. 20B to pass the DONE signal from the flip-flop 386.

If the controller receives an EXC signal over the EXC wire 111 from the drive and an EBL signal, an AND gate 389 produces a signal which also passes through the OR gate 356 in FIG. 20A to reset the RUN flip-flop 355 so the following termination of the EBL signal effectively disconnects the drive and controller. The controller can also generate an EXC signal to terminate any subsequent drive operations. An AND gate 405 produces this signal if a transfer error occurs (i.e., the TRE signal is active) during a WRITE operation before the RUN signal is activated. The AND gate 405 is thus enabled during the time the storage facility 123 is filling.

Referring to FIG. 20B, the OCC wire 112 carries an OCC signal during the time the drive is involved in a transfer. This signal passes through an OR gate 410 to disable a monostable multivibrator 411 and provide an overriding resetting signal to a flip-flop 412. During the initial stage of any transfer operation, inverters 413 and 414 energize an AND gate 415 to produce the RDY signal. This is the RDY signal which also is one of the enabling inputs to the AND gate 351 (FIG. 20A). When the function decoding circuit 350 is loaded, the RDY signal terminates and an inverter 416 triggers the multivibrator 411.

During the initial stages of a normal operation, a drive is ready to begin a transfer before the multivibrator 411 resets. If a designated drive is ready, the OCC signal passes through the OR gate 410 to disable the multivibrator 411 and to keep the flip-flop 412 reset. At the end of a transfer, the OCC signal terminates and the multivibrator 411 immediately sets. Normally, however, the BSy flip-flop 394 resets to again energize the OR gate 410 before the multivibrator 411 can time out.

If the OCC signal does not appear before the multivibrator 411 resets at the beginning of a transfer operation, the flip-flops 412 and 417 both set and produce the MXF signal. The MXF signal immediately resets the RUN flip-flop 355 through the OR gate 356 and the BSY flip-flop 394 through the OR gate 395. The BSY flip-flop 394 is also reset by an active output from the AND gate 354 in FIG. 20A so that a non-existant-drive error does not also appear as a missed-transfer error. A system clearing pulse (SCLR) also resets the flip-flop 394 while a clearing command, which produces a CLR signal, resets the MXF flip-flop 417. Thus, the OCC signal insures that the drive and controller are connected and ready to transfer within a given time. The OCC signal also insures that the controller completes its operations after a transfer within a given time. In both cases delay beyond these times produces an error condition.

There are two other ways to reset the OBUF FULL flip-flop 376. First, an AND gate 421 receives an OBout signal from the register decoder 152 and a CLK OB pulse indicating that the data has been read from the output buffer during a load register transfer. Secondly, any time a write checking error is sensed, a WR CHK ERROR signal passes through the OR gate 385 to reset the OBUF FULL flip-flop 376.

As apparent, this invention has been disclosed in terms of a specific controller and drive circuit. The discussion has been generalized and not been made in terms of any particular data processing system. Thus, the INTERRUPT signal in FIGS. 5 and 20B can constitute an interruption signal in the system of FIG. 2 or a NPR signal in the system of FIG. 3. Other system signals have also been generalized. From FIGS. 2 and 3 it will also be apparent that the synchronous data path may also be connected either to an input/output bus or memory bus in FIG. 2 or any of the common buses in FIG. 3. Specifically disclosed operations and circuits in the described controller and drive are for purposes of facilitating an understanding of the invention. Thus, we intend to cover all modifications and variations as come within the true spirit and scope of our claims.

What we claim as new and desire to secure by Letters Patent of the United States is:

1. A secondary storage facility for a data processing system comprising:
   A. a controller connected to the system including
      i. control circuit means for generating address signals and for generating and receiving control signals and control information signals, and
      ii. controller data transfer means for receiving or transmitting data and control signals,
   B. a drive for storing digital data including
      i. data storage means,
      ii. drive control circuit means for receiving address signals and for receiving and generating control signals and control information signals to effect with said control circuit means in said controller an asynchronous transfer of the control information signals,
      iii. drive data transfer means for storing data in or retrieving from said data storage means synchronously, said transfer means being coupled to said drive control circuit means to select said drive for a data transfer,
   C. asynchronous bus means for interconnecting said control circuit means in said controller and said drive, said asynchronous bus means including address, control and control information conductor means, and
   D. synchronous bus means for interconnecting said controller and drive data transfer means, said synchronous bus means including control and data conductor means.

2. A facility as recited in claim 1 wherein:
   A. said controller data transfer means includes:
      i. means for transmitting a first synchronous transfer control signal onto a corresponding control conductor means in said synchronous bus means to initiate a transfer over said data conductor means, and
      ii. means responsive to synchronizing signals on a corresponding synchronous bus control conductor means for synchronizing the controller and drive data transfer means, and
   B. said drive data transfer means includes means responsive to the first transfer control signal for producing the successive synchronizing signals on corresponding synchronous bus control conductor means.

3. A facility as recited in claim 2 wherein each of said control circuit means in said drive and controller can indicate that data on said synchronous bus means is to be stored in said drive and wherein:
   A. said controller data transfer means includes means for receiving the synchronizing signals during an operation for storing data in said drive for transmitting a storage synchronizing signal onto a corresponding synchronous bus control conductor means, and
   B. said drive data transfer means includes means receiving the storage synchronizing signal for transferring data in said synchronous bus means into said data storage means.

4. A facility as recited in claim 2 wherein said drive storage means is adapted for transferring data in blocks,
   A. said drive including means for transmitting a fourth transfer control signal onto a corresponding synchronous bus control conductor means after each block is transferred, and
   B. said controller including
      i. means coupled to said first synchronous transfer signal transmitting means for terminating the signal therefrom after all data is transferred, and
      ii. means responsive to the termination of both the first and fourth transfer control signals for terminating the selection of said drive.

5. A facility as recited in claim 1 wherein said synchronous bus control conductor means contains conductor means corresponding to a fifth transfer control signal, said controller and drive each having means for generating the fifth transfer control signal and means in said controller responsive to the fifth transfer control signal for disabling said first synchronous transfer control signal transmitting means.

6. A facility as recited in claim 2 wherein:
   A. said controller and drive each include means for generating a parity signal during each transfer of data signals over said synchronous bus data conductor means, and
   B. said synchronous bus means includes conductor means for carrying the parity signal.

7. A facility as recited in claim 2 wherein:
   A. said synchronous bus means includes a sixth transfer control conductor means,
   B. said drive includes means for generating a sixth synchronous transfer control signal while it is involved in a data transfer, and
   C. said controller includes timing means for terminating the first synchronous transfer control signal, said timing means being disabled in response to the sixth synchronous transfer control signal.

8. A facility as recited in claim 1 wherein:
   A. said control circuit means in said controller includes means for transmitting a first asynchronous transfer control signal onto a corresponding control conductor means in said asynchronous bus means, and
   B. said drive includes
      i. means connected to said first asynchronous transfer control conductor means for transferring information between said control information conductor means and said drive, and
      ii. means responsive to the completion of information transfer for transmitting a second asynchronous control signal onto a corresponding asynchronous control conductor means, said first asynchronous transfer control signal transmitting means being disabled in response to the receipt of the second asynchronous transfer control signal, the first and second asynchronous transfer control signals thereby controlling the transfer of control information signals over said asynchronous control information conductor means.

9. A facility as recited in claim 8 wherein:
   A. said controller includes
      i. means for transmitting a third transfer control signal for indicating the direction of transfer over said control information conductor means, and
      ii. means responsive to a first value of the third transfer control signal and the first asynchronous control signal for transferring the control information signals to said drive, and B. said drive including means responsive to a second value of the third transfer control signal and the second asynchronous control signal for transferring the control information signals to said controller.

10. A facility as recited in claim 8 including a plurality of drives connected to both said bus means, each said drive having at least one corresponding register, said asynchronous bus address conductor means including drive selection wires and register selection wires, each drive including a drive address decoder responsive to the selection signal for enabling its control circuit means to respond to signals on said register selection wires.

11. A facility as recited in claim 8 wherein said drive and controller each include means for generating a parity signal during a control information transfer, said asynchronous bus control conductor means including a wire for transferring the parity signal.

12. A facility as recited in claim 8 including a plurality of drives, each of said drives including means for monitoring error conditions in said drive and means responsive to said monitoring means for generating a fourth transfer control signal in response to the error conditions, said asynchronous control conductor means having a common wire for connection to all of said fourth transfer control signal generating means in each of said drives.

13. A drive for connection to a controller to form a secondary storage facility for use in a data processing system, said controller including means for transmitting and receiving address, asynchronous control and control information signals over an asynchronous data path and means for transmitting and receiving data and synchronous control signals over a synchronous data path, said drive comprising:

A. data storage means,
B. control information storage means,
C. drive control circuit means for receiving address and asynchronous control signals from the asynchronous control path for storing control information in said control information storage means, said drive control circuit means including means for connection to the asynchronous control path, and
D. data transfer means coupled to said control information storage means and said data storage means for coupling synchronously data to or from selected ones of said data storage means, said data transfer means including:
   i. means coupled to said drive control circuit means for selecting said drive for a data transfer over the synchronous data path,
   ii. means responsive to a first synchronous control signal from the controller over the synchronous data path for initiating a transfer over the synchronous data path, and
   iii. means for transmitting second synchronizing control signals in succession for synchronizing successive data transfers over the synchronous data path.

14. A drive as recited in claim 13 wherein data transfers are made in blocks, said drive additionally including means for transmitting third transfer control signals after each block is transferred onto the synchronous data path, and means responsive to the first synchronous control signal and the third control signal for terminating the selection of said drive.

15. A drive as recited in claim 14 additionally including

A. means for monitoring error conditions in said drive,
B. means connected to said monitoring means for transmitting a fourth transfer control signal onto the synchronous data path in response to the error conditions, and
C. means responsive to the receipt of the fourth transfer control signal from said drive or from the synchronous data path for terminating a data transfer, the controller being responsive to the appearance of the fourth transfer control signal for terminating the first transfer control signal.

16. A drive as recited in claim 14 including means for storing data in said data storage means, the controller being responsive to the second synchronizing signal for generating fifth synchronizing signals in conjunction with the data, said drive including means responsive to the fifth synchronizing signals on the synchronous control path for storing data in said data storage means.

17. A drive as recited in claim 14 wherein said drive includes means for generating a sixth transfer control signal while it is involved in a data transfer onto the synchronous data path, the controller sensing the presence of the sixth control data signal to disable timing means therein which control the transmission of the first transfer control signal.

18. A drive as recited in claim 14 wherein the synchronous data path carries a data parity signal during each data transfer, said drive including:
   i. means for transmitting a parity signal onto said synchronous data path during each data transfer from said drive, and
   ii. means for receiving and decoding the parity signal from the synchronous data path during each data transfer to said drive.

19. A drive as recited in claim 13 wherein said drive control circuit means includes:
A. means for receiving a first asynchronous control signal from the asynchronous data path indicating a transfer of control information with said drive,
B. means for effecting the control information transfer in response to the asynchronous control signal,
C. means for transmitting a second asynchronous control signal onto the asynchronous control path indicating the completion of a transfer, the controller disabling the first asynchronous transfer control signal in response to the second asynchronous control signal.

20. A drive as recited in claim 19 wherein said drive control circuit means includes:
A. means for receiving a third asynchronous control signal indicating the direction of transfer with respect to said control information storage means,
B. means responsive to a first value of the third transfer control signal and the generation of the first asynchronous transfer control signal for storing control information in said control information storage means, and
C. means responsive to a second value of the third transfer control signal and the second asynchronous control signal for transferring control information from said control information storage means into the asynchronous data path.

21. A drive as recited in claim 19 wherein said control information storage means includes a plurality of addressed locations and means responsive to address signals on the asynchronous control path for selecting a specific one of the registers.

22. A drive as recited in claim 19 including means for monitoring error conditions in said drive and means responsive to said monitoring means for generating a fourth transfer control signal in response to the error conditions onto the asynchronous control path.

23. A drive as recited in claim 19 additionally including means for generating a parity signal during a control information transfer from said storage means and means for decoding a parity signal on the asynchronous control path during a transfer to said storage means.

24. A controller for use with a drive in a secondary storage facility, the drive including control information storage means, means for effecting transfers between the drive and said controller over synchronous and asynchronous data paths in a device bus for connection to said controller and to be connected to a data processing system with means for transmitting data transfer commands by means of a system bus, said controller comprising:
  A. an asynchronous data path for coupling the system bus and asynchronous section of the device bus including
   i. storage means for control information including a system bus address storage means,
   ii. address means responsive to address signals on the system bus for identifying a control information storage means in said controller or in a drive,
   iii. means for transferring control information between the system bus and a storage means designated by said address means, and
   iv. control means responsive to the address means and control signals from the system bus for transmitting signals onto the asynchronous section of the device bus to effect a transfer of control information, and
  B. a synchronous data path including:
   i. data buffer means in seriatum between the system bus and the synchronous section of the device bus,
   ii. means for transferring data between the system bus at a location identified by said address storage means and said data buffer,
   iii. control means responsive to a data transfer command for transferring a first synchronizing signal to the drive over the synchronous section of the device bus, the drive initiating a data transfer and transmitting a second synchronizing signal onto the device bus, and
   iv. means responsive to the second control signals on the device bus for effecting a transfer between the device bus and the data buffer.

25. A controller as recited in claim 24 additionally comprising:
  A. first and second storage means in said asynchronous data path for storing a number representing the number of data words to be transferred in response to a data transfer command,
  B. means responsive to each transfer between the system bus and said data buffer for altering the contents of said first transfer length storage means,
  C. means responsive to each transfer between the drive and said data buffer for altering the contents of said second length storage means, and
  D. means responsive to a signal from said second length storage means for disabling the first synchronizing control signal, the drive terminating further transfers upon sensing the absence of the first synchronizing control signal and a following third transfer control signal identifying the completion of a block of data transfers.

26. A controller as recited in claim 25 additionally comprising
  A. means for monitoring error conditions on said drive,
  B. means coupled to said monitoring means for transmitting a fourth transfer control signal onto the synchronous data path in response to the error conditions, and
  C. means responsive to the receipt of the fourth transfer control signal from a drive or from said transmitting means for disabling said first synchronizing signal transmitting means.

27. A controller as recited in claim 25 wherein one data transfer command identifies an operation for storing data in said drive, said controller additionally including means responsive to said data transfer means and to the receipt of the second synchronizing signal from a drive for generating a fifth synchronizing signal indicating the presence of data and means for synchronizing the transfer of data from said data buffer onto the device bus with the fifth synchronizing signal.

28. A drive as recited in claim 25 wherein said controller includes means for transmitting a sixth transfer control signal while it is involved in a data transfer, said controller additionally including:
  A. timing means for disabling said first transfer control signal after a predetermined interval, and
  B. means responsive to the sixth control signal for disabling said timing means.

29. A controller as recited in claim 25 additionally including
  A. means for transmitting a parity signal onto said synchronous data path during data transfers from said controller,
  B. means for decoding a data parity signal on said device bus during the receipt of data from a drive, and
  C. means responsive to a parity error for causing a system interruption.

30. A controller as recited in claim 24 wherein said asynchronous data path control means includes
  A. means responsive to said address means for transmitting a first asynchronous control signal to a drive to effect a transfer, and
  B. means responsive to the receipt of a second asynchronous control signal from the drive indicating the completion of a transfer for terminating the first transfer control signal.

31. A controller as recited in claim 30 additionally including:
  A. means for transmitting a third transfer control signal indicating whether the transfer is to store control information in the drive or retrieve control information from the drive,
  B. means responsive to a first value of the third transfer control signal and the receipt of a second transfer control signal for transferring data onto the system bus, and
  C. means responsive to a second value of the third transfer control signal and transmission of the first transfer control signal for transferring control information onto the device bus.

32. A controller as recited in claim 31 additionally comprising:
  A. means for generating a parity signal during each control information transfer to the drive,
  B. means for receiving parity signals during transfers of control information from the drive, and
  C. means for generating an error signal in response to a decoded parity error.

* * * * *